(12) United States Patent
Suzuki

(10) Patent No.: US 9,266,351 B2
(45) Date of Patent: Feb. 23, 2016

(54) OPTICAL SCANNING DEVICE AND IMAGE FORMING APPARATUS

(75) Inventor: Seizo Suzuki, Chiba (JP)

(73) Assignee: RICOH COMPANY, LIMITED, Tokyo (JP)

( * ) Notice: Subject to any disclaimer, the term of this patent is extended or adjusted under 35 U.S.C. 154(b) by 218 days.

(21) Appl. No.: 12/979,774

(22) Filed: Dec. 28, 2010

(65) Prior Publication Data

US 2011/0169906 A1    Jul. 14, 2011

(30) Foreign Application Priority Data

Jan. 13, 2010 (JP) ................ 2010-004527

(51) Int. Cl.
| | |
|---|---|
| B41J 2/45 | (2006.01) |
| B41J 2/455 | (2006.01) |
| B41J 2/47 | (2006.01) |
| G02B 26/12 | (2006.01) |

(52) U.S. Cl.
CPC .. *B41J 2/473* (2013.01); *B41J 2/45* (2013.01); *B41J 2/455* (2013.01); *G02B 26/123* (2013.01)

(58) Field of Classification Search
CPC ............... B41J 2/45; B41J 2/455; B41J 2/473
USPC ......... 347/111, 112, 129, 131, 132, 224, 225, 347/233, 237, 240, 247, 251, 252, 253
See application file for complete search history.

(56) References Cited

U.S. PATENT DOCUMENTS

| | | | |
|---|---|---|---|
| 4,995,710 A | 2/1991 | Suzuki et al. | |
| 5,005,928 A | 4/1991 | Suzuki et al. | |
| 5,355,244 A | 10/1994 | Suzuki et al. | |
| 5,459,601 A | 10/1995 | Suzuki et al. | |
| 5,546,216 A | 8/1996 | Suzuki | |
| 5,606,181 A | 2/1997 | Sakuma et al. | |

(Continued)

FOREIGN PATENT DOCUMENTS

| | | |
|---|---|---|
| JP | 4-149522 | 5/1992 |
| JP | 10-221903 | 8/1998 |

(Continued)

OTHER PUBLICATIONS

Office Action dated Jul. 17, 2013, issued in Japanese Patent Application No. 2010-004527.

*Primary Examiner* — Kristal Feggins
*Assistant Examiner* — Kendrick Liu
(74) *Attorney, Agent, or Firm* — Oblon, McClelland, Maier & Neustadt, L.L.P.

(57) ABSTRACT

Each light source has plural light emitting portions that are arranged at the different positions in at least a sub-scanning corresponding direction. A memory of a scanning control device stores correction data of the deviation of the beam pitch, correction data of the light amount difference, and correction data to decrease an influence of a reciprocity failure, for each combination of pixel forming light emitting portions. When a write signal is generated, a write control circuit of the scanning control device reads the correction data of the deviation of the beam pitch, the correction data of the light amount difference, and the correction data of the reciprocity failure according to the combination of the pixel forming light emitting portions from the memory, overlaps the read correction data to correction data of an APC, and outputs the overlapped data to a corresponding light source unit as light amount correction data.

15 Claims, 27 Drawing Sheets

(56) References Cited

U.S. PATENT DOCUMENTS

| | | |
|---|---|---|
| 5,717,511 A | 2/1998 | Suzuki |
| 5,875,051 A | 2/1999 | Suzuki et al. |
| 5,986,791 A | 11/1999 | Suzuki et al. |
| 6,069,724 A | 5/2000 | Hayashi et al. |
| 6,081,386 A | 6/2000 | Hayashi et al. |
| 6,104,522 A | 8/2000 | Hayashi et al. |
| 6,141,133 A | 10/2000 | Suzuki et al. |
| 6,222,662 B1 | 4/2001 | Suzuki et al. |
| 6,233,081 B1 | 5/2001 | Suzuki et al. |
| 6,256,133 B1 | 7/2001 | Suzuki et al. |
| 6,330,017 B1 | 12/2001 | Suzuki |
| 6,347,004 B1 | 2/2002 | Suzuki et al. |
| 6,359,717 B2 | 3/2002 | Suzuki et al. |
| 6,384,949 B1 | 5/2002 | Suzuki |
| 6,388,792 B1 | 5/2002 | Atsuumi et al. |
| 6,400,391 B1 | 6/2002 | Suhara et al. |
| 6,417,509 B1 | 7/2002 | Atsuumi et al. |
| 6,448,998 B1 | 9/2002 | Suzuki et al. |
| 6,509,995 B1 | 1/2003 | Suzuki et al. |
| 6,596,985 B2 | 7/2003 | Sakai et al. |
| 6,606,179 B2 | 8/2003 | Suzuki et al. |
| 6,657,761 B2 | 12/2003 | Suzuki et al. |
| 6,697,181 B2 | 2/2004 | Masuda |
| 6,744,545 B2 | 6/2004 | Suhara et al. |
| 6,771,407 B2 | 8/2004 | Hayashi et al. |
| 6,781,729 B2 | 8/2004 | Suzuki et al. |
| 6,785,028 B1 | 8/2004 | Atsuumi et al. |
| 6,788,444 B2 | 9/2004 | Suzuki et al. |
| 6,791,729 B2 | 9/2004 | Atsuumi et al. |
| 6,800,845 B2 | 10/2004 | Sakai et al. |
| 6,801,351 B2 | 10/2004 | Suzuki et al. |
| 6,813,051 B2 | 11/2004 | Suzuki et al. |
| 6,829,104 B2 | 12/2004 | Suzuki et al. |
| 6,833,940 B2 | 12/2004 | Suzuki et al. |
| 6,847,472 B2 | 1/2005 | Masuda |
| 6,862,123 B2 | 3/2005 | Suzuki et al. |
| 6,867,890 B2 | 3/2005 | Suzuki et al. |
| 6,870,652 B2 | 3/2005 | Suhara et al. |
| 6,906,739 B2 | 6/2005 | Suzuki et al. |
| 6,937,371 B2 | 8/2005 | Hayashi et al. |
| 6,999,208 B2 | 2/2006 | Suzuki et al. |
| 7,003,241 B1 * | 2/2006 | Kobayashi et al. ............. 399/72 |
| 7,006,120 B2 | 2/2006 | Sakai et al. |
| 7,006,270 B2 | 2/2006 | Suzuki et al. |
| 7,012,724 B2 | 3/2006 | Atsuumi et al. |
| 7,038,822 B2 | 5/2006 | Sakai et al. |
| 7,045,773 B2 | 5/2006 | Suzuki et al. |
| 7,050,082 B2 | 5/2006 | Suzuki et al. |
| 7,061,658 B2 | 6/2006 | Suzuki |
| 7,068,407 B2 | 6/2006 | Sakai et al. |
| 7,072,127 B2 | 7/2006 | Suhara et al. |
| 7,088,485 B2 | 8/2006 | Suzuki |
| 7,110,016 B2 | 9/2006 | Suzuki et al. |
| 7,167,288 B2 | 1/2007 | Miyatake et al. |
| 7,215,354 B1 | 5/2007 | Sakai et al. |
| 7,256,815 B2 | 8/2007 | Suzuki et al. |
| 7,277,212 B2 | 10/2007 | Miyatake et al. |
| 7,333,254 B2 | 2/2008 | Amada et al. |
| 7,355,770 B2 | 4/2008 | Miyatake et al. |
| 7,403,316 B2 | 7/2008 | Amada |
| 7,450,274 B2 | 11/2008 | Itabashi et al. |
| 7,525,561 B2 | 4/2009 | Nakajima et al. |
| 7,532,227 B2 | 5/2009 | Nakajima et al. |
| 7,706,040 B2 | 4/2010 | Amada et al. |
| 7,719,737 B2 | 5/2010 | Amada et al. |
| 7,760,223 B2 | 7/2010 | Suzuki et al. |
| 7,764,301 B2 | 7/2010 | Suzuki et al. |
| 7,777,774 B2 | 8/2010 | Suzuki et al. |
| 2002/0036688 A1 * | 3/2002 | Saito et al. ............. 347/239 |
| 2006/0256185 A1 | 11/2006 | Suzuki et al. |
| 2007/0132828 A1 * | 6/2007 | Ishida et al. ............. 347/233 |
| 2008/0019255 A1 | 1/2008 | Imai et al. |
| 2008/0117279 A1 * | 5/2008 | Koga et al. ............. 347/248 |
| 2008/0123160 A1 * | 5/2008 | Omori et al. ............. 358/475 |
| 2008/0204852 A1 | 8/2008 | Amada et al. |
| 2008/0239336 A1 * | 10/2008 | Tanabe et al. ............. 358/1.7 |
| 2008/0267663 A1 | 10/2008 | Ichii et al. |
| 2009/0067882 A1 * | 3/2009 | Kuribayashi ............. 399/220 |
| 2009/0074437 A1 | 3/2009 | Tanabe et al. |
| 2009/0141316 A1 * | 6/2009 | Arai et al. ............. 358/475 |
| 2009/0175657 A1 | 7/2009 | Yoshii et al. |
| 2010/0118366 A1 | 5/2010 | Tokita et al. |
| 2011/0298883 A1 * | 12/2011 | Ohyama ............. 347/224 |

FOREIGN PATENT DOCUMENTS

| | | |
|---|---|---|
| JP | 2000-37904 | 2/2000 |
| JP | 2002-113903 | 4/2002 |
| JP | 2007-196460 | 8/2007 |
| JP | 2007-249172 | 9/2007 |
| JP | 2008-170640 | 7/2008 |
| JP | 2009-29115 | 2/2009 |

* cited by examiner

FIG. 3
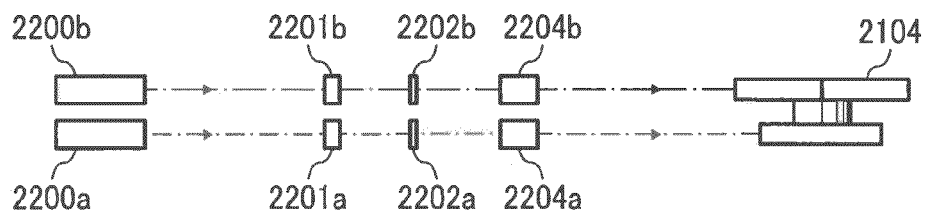
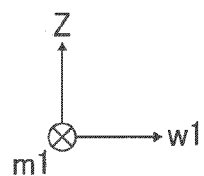
FIG. 4
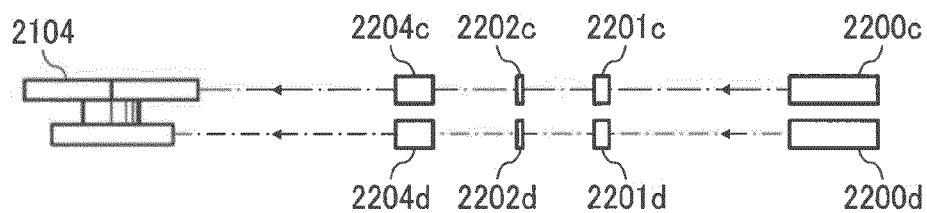
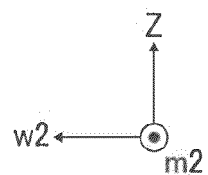

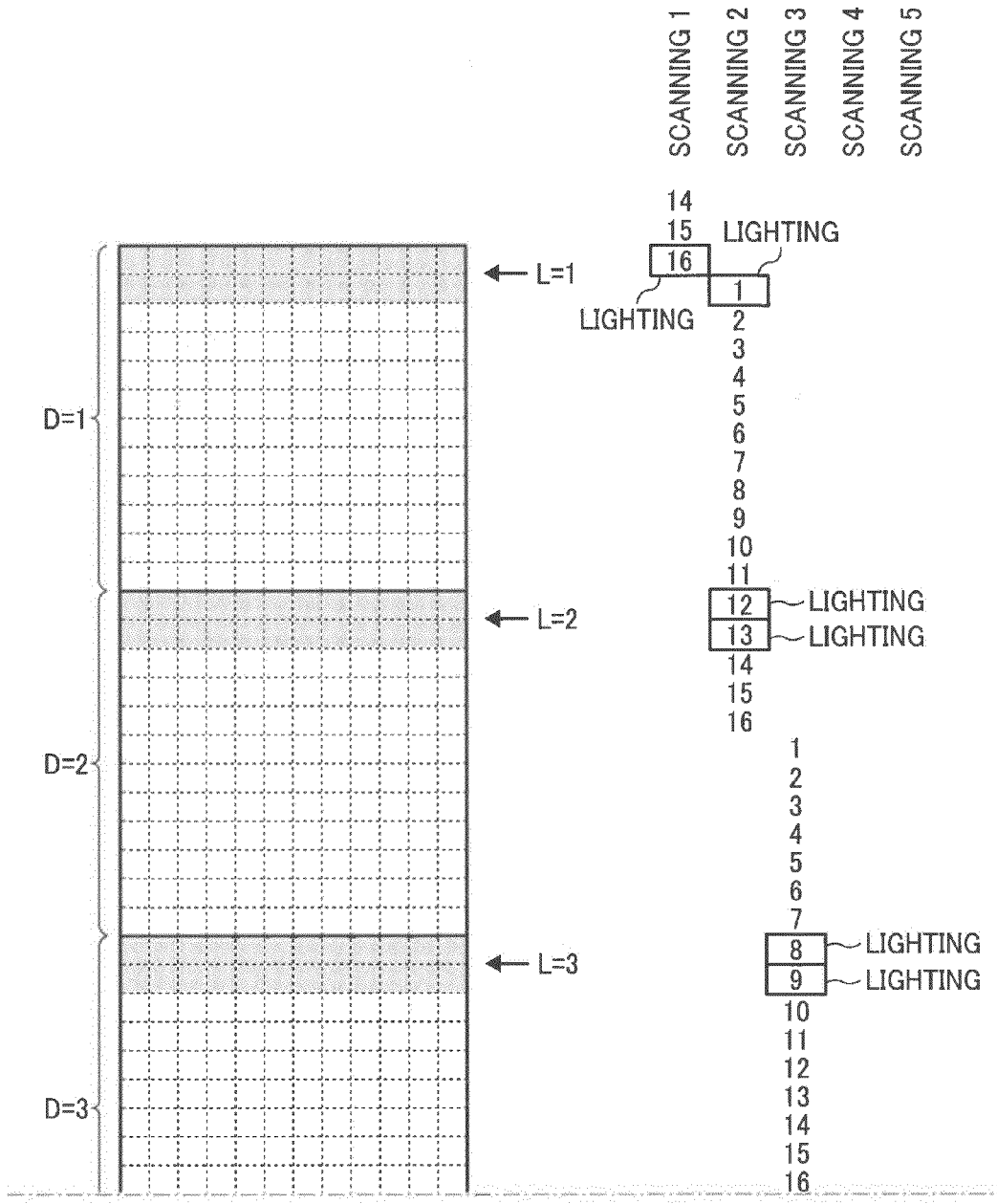

FIG. 12

| COMBINATION OF LIGHT EMITTING PORTIONS | ch1/ch2 | ch2/ch3 | ch3/ch4 | ch4/ch5 |
|---|---|---|---|---|
| LIGHTING OF BOTH LIGHT EMITTING PORTIONS | NON-CORRECTION | NON-CORRECTION | NON-CORRECTION | NON-CORRECTION |
| LIGHTING OF SINGLE LIGHT EMITTING PORTION | NON-CORRECTION | NON-CORRECTION | NON-CORRECTION | NON-CORRECTION |

| COMBINATION OF LIGHT EMITTING PORTIONS | ch5/ch6 | ch6/ch7 | ch7/ch8 | ch8/ch9 |
|---|---|---|---|---|
| LIGHTING OF BOTH LIGHT EMITTING PORTIONS | NON-CORRECTION | NON-CORRECTION | NON-CORRECTION | NON-CORRECTION |
| LIGHTING OF SINGLE LIGHT EMITTING PORTION | NON-CORRECTION | NON-CORRECTION | NON-CORRECTION | NON-CORRECTION |

| COMBINATION OF LIGHT EMITTING PORTIONS | ch9/ch10 | ch10/ch11 | ch11/ch12 | ch12/ch13 |
|---|---|---|---|---|
| LIGHTING OF BOTH LIGHT EMITTING PORTIONS | NON-CORRECTION | NON-CORRECTION | NON-CORRECTION | NON-CORRECTION |
| LIGHTING OF SINGLE LIGHT EMITTING PORTION | NON-CORRECTION | NON-CORRECTION | NON-CORRECTION | NON-CORRECTION |

| COMBINATION OF LIGHT EMITTING PORTIONS | ch13/ch14 | ch14/ch15 | ch15/ch16 | ch16/ch1 |
|---|---|---|---|---|
| LIGHTING OF BOTH LIGHT EMITTING PORTIONS | NON-CORRECTION | NON-CORRECTION | NON-CORRECTION | CORRECTION |
| LIGHTING OF SINGLE LIGHT EMITTING PORTION | NON-CORRECTION | NON-CORRECTION | NON-CORRECTION | NON-CORRECTION |

| DEVIATION AMOUNT OF BEAM PITCH (μm) | CORRECTION DATA | | |
|---|---|---|---|
| | ch16 | ch1 | SUM |
| −4 | 1.08 | 1.08 | 2.16 |
| −2 | 1.04 | 1.04 | 2.08 |
| 0 | 1.00 | 1.00 | 2.00 |
| +2 | 0.96 | 0.96 | 1.92 |
| +4 | 0.92 | 0.92 | 1.84 |

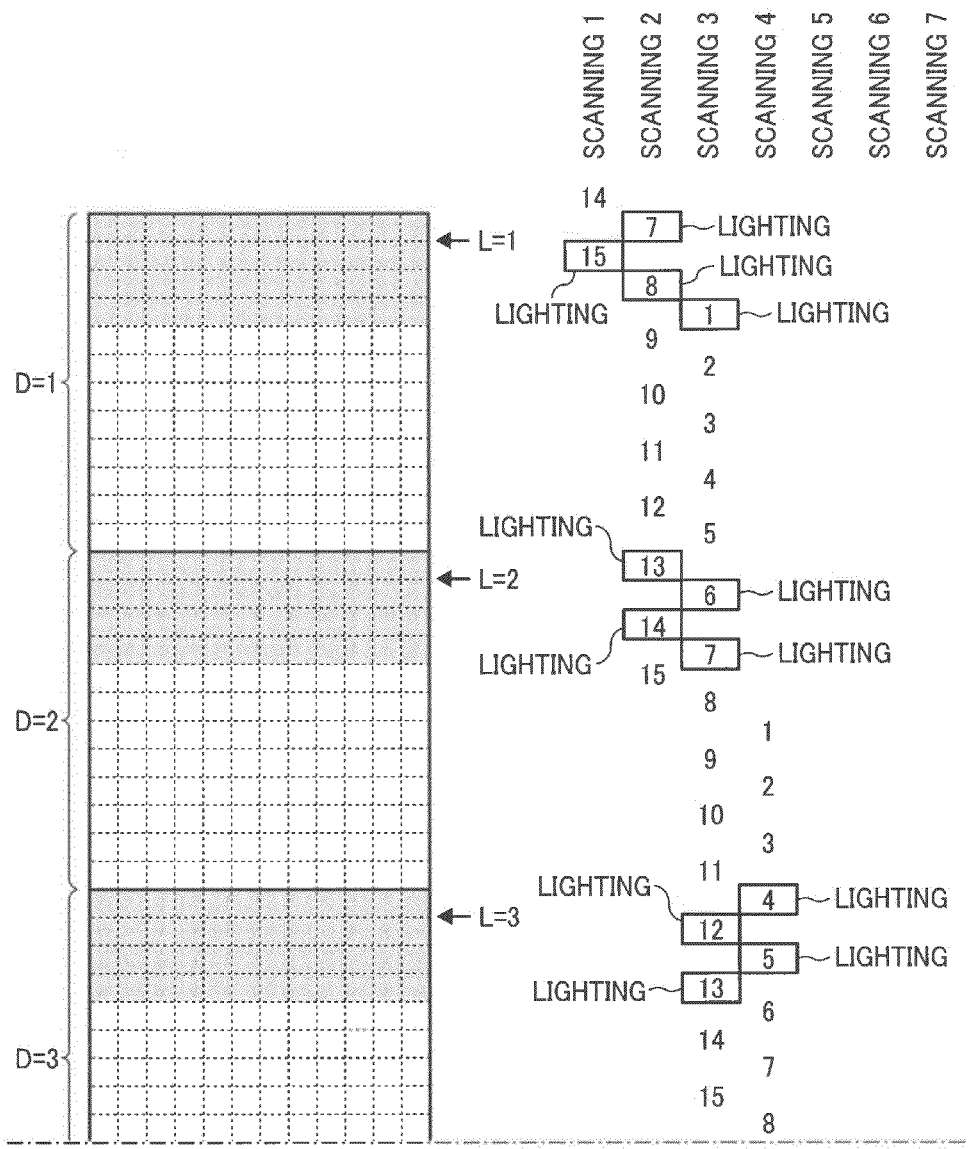

FIG. 17

| SUB-PIXEL | COMBI-NATION A | | | COMBI-NATION B | | | COMBI-NATION C | | | COMBI-NATION D | | | COMBI-NATION E | | | COMBI-NATION F | | | COMBI-NATION G | | | COMBI-NATION H | | |
|---|---|---|---|---|---|---|---|---|---|---|---|---|---|---|---|---|---|---|---|---|---|---|---|---|
| | SCAN 1 | SCAN 2 | SCAN 3 | SCAN 1 | SCAN 2 | SCAN 3 | SCAN 1 | SCAN 2 | SCAN 3 | SCAN 1 | SCAN 2 | SCAN 3 | SCAN 1 | SCAN 2 | SCAN 3 | SCAN 1 | SCAN 2 | SCAN 3 | SCAN 1 | SCAN 2 | SCAN 3 | SCAN 1 | SCAN 2 | SCAN 3 |
| m1 | 15 | | | 15 | | | 8 | | | | | | 9 | | | | | | 10 | | | | | |
| m2 | | 7 | | | 8 | | | 1 | | 9 | | | | 2 | | 10 | 2 | | | 3 | | | 3 | |
| m3 | | 8 | | | | | 9 | | | 10 | 1 | | 10 | | | 11 | 3 | | 11 | | | 11 | | |
| m4 | | | 1 | | | 1 | | | 2 | | | 2 | | | 3 | | | | | | 4 | | | 4 |

| SUB-PIXEL | COMBI-NATION I | | | COMBI-NATION J | | | COMBI-NATION K | | | COMBI-NATION L | | | COMBI-NATION M | | | COMBI-NATION N | | | COMBI-NATION O | | |
|---|---|---|---|---|---|---|---|---|---|---|---|---|---|---|---|---|---|---|---|---|---|
| | SCAN 1 | SCAN 2 | SCAN 3 | SCAN 1 | SCAN 2 | SCAN 3 | SCAN 1 | SCAN 2 | SCAN 3 | SCAN 1 | SCAN 2 | SCAN 3 | SCAN 1 | SCAN 2 | SCAN 3 | SCAN 1 | SCAN 2 | SCAN 3 | SCAN 1 | SCAN 2 | SCAN 3 |
| m1 | 11 | | | 12 | | | 12 | | | 13 | | | 13 | | | 14 | | | 14 | | |
| m2 | | 4 | | | 4 | | | 5 | | | 5 | | | 6 | | | 6 | | | 7 | |
| m3 | 12 | | | 13 | | | 13 | | | 14 | | | 14 | | | 15 | | | 15 | | |
| m4 | | 5 | | | 5 | | | 6 | | | 6 | | | 7 | | | 7 | | | 8 | |

FIG. 18

| NUMBER OF LIGHTING LIGHT EMITTING PORTIONS | LIGHTING LIGHT EMITTING PORTION | | | | COMBINATION | | | | | | | | | | | | | | |
|---|---|---|---|---|---|---|---|---|---|---|---|---|---|---|---|---|---|---|---|
| | m1 | m2 | m3 | m4 | A | B | C | D | E | F | G | H | I | J | K | L | M | N | O |
| 4 | O | O | O | O | O | O | △ | △ | △ | △ | △ | △ | △ | △ | △ | △ | △ | △ | △ |
| 3 | O | O | O |   | △ | O | △ | △ | △ | △ | △ | △ | △ | △ | △ | △ | △ | △ | △ |
| 3 | O | O |   | O | △ | △ | △ | △ | △ | △ | △ | △ | △ | △ | △ | △ | △ | △ | △ |
| 3 | O |   | O | O | △ | △ | △ | △ | △ | △ | △ | △ | △ | △ | △ | △ | △ | △ | △ |
| 3 |   | O | O | O | O | △ | △ | △ | △ | △ | △ | △ | △ | △ | △ | △ | △ | △ | △ |
| 2 | O | O |   |   | △ | △ | △ | △ | △ | △ | △ | △ | △ | △ | △ | △ | △ | △ | △ |
| 2 | O |   | O |   | – | △ | – | – | – | – | – | – | – | – | – | – | – | – | – |
| 2 | O |   |   | O | – | – | – | – | – | – | – | – | – | – | – | – | – | – | – |
| 2 |   | O | O |   | △ | △ | △ | △ | △ | △ | △ | △ | △ | △ | △ | △ | △ | △ | △ |
| 2 |   | O |   | O | △ | – | – | – | – | – | – | – | – | – | – | – | – | – | – |
| 2 |   |   | O | O | △ | △ | △ | △ | △ | △ | △ | △ | △ | △ | △ | △ | △ | △ | △ |
| 1 | O |   |   |   | – | – | – | – | – | – | – | – | – | – | – | – | – | – | – |
| 1 |   | O |   |   | – | – | – | – | – | – | – | – | – | – | – | – | – | – | – |
| 1 |   |   | O |   | – | – | – | – | – | – | – | – | – | – | – | – | – | – | – |
| 1 |   |   |   | O | – | – | – | – | – | – | – | – | – | – | – | – | – | – | – |

FIG. 19

| LIGHTING LIGHT EMITTING PORTION | | | | DEVIATION AMOUNT OF BEAM PITCH (μm) | COMBINATION A | | | | | COMBINATION B | | | | |
|---|---|---|---|---|---|---|---|---|---|---|---|---|---|---|
| m1 | m2 | m3 | m4 | | 15 | 7 | 8 | 1 | SUM | 15 | 8 | 9 | 1 | SUM |
|  |  |  | ○ | −4 | 0.89 | 1.19 | 0.74 | 1.19 | 4.01 | 1.30 | 0.70 | 1.13 | 0.87 | 4.00 |
|  |  | ○ |  | 0 | 1.00 | 1.00 | 1.00 | 1.00 | 4.00 | 1.00 | 1.00 | 1.00 | 1.00 | 4.00 |
|  |  |  | ○ | +4 | 1.07 | 0.90 | 1.19 | 0.84 | 4.00 | 0.80 | 1.37 | 0.91 | 0.91 | 3.99 |
|  | ○ |  |  | −4 |  |  |  |  |  | 1.46 | 0.08 | 0 | 1.46 | 3.00 |
|  | ○ | ○ | ○ | 0 | 1.46 | 0.08 | 0 | 1.46 | 3.00 | 1.00 | 1.00 | 0 | 1.00 | 3.00 |
| ○ | ○ | ○ | ○ | +4 | 1.00 | 1.00 | 0 | 1.00 | 3.00 | 0.71 | 1.57 | 0 | 0.71 | 2.99 |
| ○ | ○ |  |  | −4 | 0.71 | 1.57 | 0 | 0.71 | 2.99 |  |  |  |  |  |

FIG. 20

| LIGHTING LIGHT EMITTING PORTION | | | | COMBINATION A | | | | COMBINATION B | | | |
|---|---|---|---|---|---|---|---|---|---|---|---|
| m1 | m2 | m3 | m4 | 15 | 7 | 8 | 1 | SUM | 15 | 8 | 9 | 1 | SUM |
| ○ | ○ | ○ | ○ | 1.00 | 1.00 | 0.95 | 0.95 | 3.90 | 0.95 | 0.95 | 1.00 | 1.00 | 3.90 |

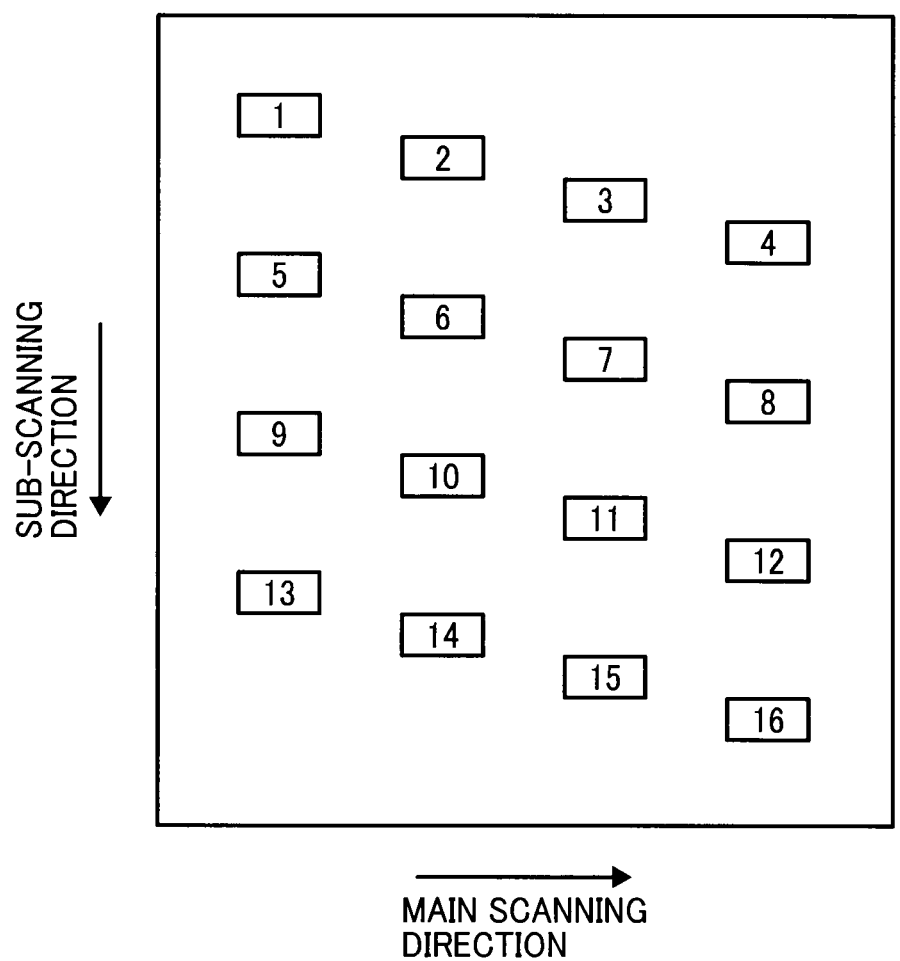

| LIGHT EMITTING PORTION | LIGHTING TIMING | PIXEL |
|---|---|---|
| a1 | | P1 |
| a2 | | |
| a3 | | |
| a4 | | |
| b1 | | P2 |
| b2 | | |
| b3 | | |
| b4 | | |
| c1 | | P3 |
| c2 | | |
| c3 | | |
| c4 | | |

NON-DEVIATION OF BEAM PITCH

DEVIATION OF BEAM PITCH
BY CHANGE OF OPTICAL MAGNIFICATION

DEVIATION OF BEAM PITCH
BY ROTATION OF LIGHT SOURCE

OPTICAL SCANNING DEVICE AND IMAGE FORMING APPARATUS

CROSS-REFERENCE TO RELATED APPLICATIONS

The present application claims priority to and incorporates by reference the entire contents of Japanese Patent Application No. 2010-004527 filed in Japan on Jan. 13, 2010.

BACKGROUND OF THE INVENTION

1. Field of the Invention

The present invention relates to an optical scanning device and an image forming apparatus, and more particularly, to an optical scanning device that scans a scanned surface with light and an image forming apparatus that includes the optical scanning device.

2. Description of the Related Art

An image forming apparatus such as a printer or a digital copying machine that uses a laser beam is widely used to record an electrophotographic image. This image forming apparatus includes an optical scanning device. In recording the electrophotographic image, a method that scans a laser beam in an axial direction of a drum having photosensitivity (hereinafter, referred to as "photosensitive drum") using a deflector (for example, polygon mirror) and rotates the photosensitive drum to form a latent image on the surface (scanned surface) of the photosensitive drum is generally used.

For example, as shown in FIG. 24, a method that forms one pixel by plural light beams is known. In FIG. 24, 12 light emitting portions (a1 to a4, b1 to b4, and c1 to c4) are arranged at an interval of 4800 dpi on an image surface, in a sub-scanning corresponding direction. As shown in FIG. 25, one pixel is formed by 4 light beams at an interval of 1200 dpi on an image surface.

In the image forming apparatus that forms one pixel by plural light beams, the following advantages exist. (1) Since a method that is implemented by the image forming apparatus is superior to a method that forms one pixel by one light beam in terms of the light amount, high-speed write is enabled. (2) Since one pixel can be further divided, smoothness of an inclined line can be secured (jaggy can be decreased), sharpness of a character can be improved, and distortion correction of an image such as correction of bending and inclination based on image processing can be performed.

Meanwhile, since combinations of light emitting portions to emit light beams to form one pixel (hereinafter, simply referred to as "pixel forming light emitting portions") are sequentially changed, the image density of each pixel is easily changed due to the beam pitch irregularity on an image surface, the light amount irregularity between light sources, and a reciprocity failure.

Even when the combinations of the pixel forming light emitting portions are plural, the same combination is periodically repeated. For this reason, the image density change may be periodically generated and an abnormal image called "banding" or "texture" may be easily generated.

In particular, when the number of light beams in multiple beams increases, a period of the image density change increases, and easily becomes a period of a region (about 1 line/mm) where perceptual sensitivity of human eyes is high. In this case, the banding is easily viewed.

As generation factors of the banding in an optical scanning device to perform optical scanning using multiple beams, (1) the change of the exposure width due to the deviation of the beam pitch, (2) the change of exposure distribution due to the light amount difference, (3) a reciprocity failure, and (4) the rotational change of a photosensitive drum or the mechanical change such as the surface tilt of a polygon mirror are known.

1. Regarding Deviation of Beam Pitch

FIG. 26A shows a state where the beam pitch is ideally adjusted. For example, when the density of the sub-pixels is 4800 dpi, light emitting portions are aligned at almost the interval of 5 μm on an image surface.

FIG. 26B shows the case where magnification of an optical system is deviated from an ideal value. In this case, even though plural light emitting portions are aligned at an equivalent interval, an interval of light beams is deviated from an ideal interval (5 μm). In FIG. 26B, the interval becomes wider than the ideal interval.

FIG. 26C shows the case where rotation of a light source around a central axis thereof is deviated. In this case, an interval of the plural light emitting portions in a sub-scanning direction is not constant.

As such, when one pixel is formed by plural light beams having the deviated beam pitch, a shape of one pixel is collapsed and the density is changed. Since the combinations of the pixel forming light emitting portions are sequentially changed and the same combination is periodically repeated, the banding is easily generated.

FIGS. 27(A) to 27(C) show influences from the deviation of the beam pitch in the case where two light beams (bm1 and bm2) and two light beams (bm3 and bm4) are deflected on different deflected reflection surfaces of a polygon mirror. FIGS. 27(A) to 27(C) show an aspect where the magnitude of one pixel changes according to the deviation of the beam pitch, in the case where one pixel is formed by 4 light beams. FIG. 27(A) shows the magnitude of one pixel when the beam pitch is the ideal pitch. FIG. 27(B) shows the magnitude of one pixel when the beam pitch of the light beams bm2 and bm3 is less than the ideal pitch. FIG. 27(C) shows the magnitude of one pixel when the beam pitch of the light beams bm2 and bm3 is more than the ideal pitch.

2. Regarding Light Amount Difference

FIG. 28(A) shows the case where the light amounts of 4 light beams are equal to each other. FIG. 28(B) shows the case where the light amounts of the light beams bm1 and bm4 are less than the light amounts in the case of FIG. 28(A) and the light amounts of the light beams bm2 and bm3 are more than the light amounts in the case of FIG. 28(A). In this case, an exposure range based on the four light beams in the sub-scanning direction becomes narrower than an exposure range in the case of FIG. 28(A).

FIG. 28(C) shows the case where the light amounts of the light beams bm1 and bm4 are more than the light amounts in the case of FIG. 28(A) and the light amounts of the light beams bm2 and bm3 are less than the light amounts in the case of FIG. 28(A). In this case, an exposure range based on the four light beams in the sub-scanning direction becomes wider than an exposure range in the case of FIG. 28(A).

Since the density of one pixel is periodically changed, this becomes a generation factor of the banding, similar to the deviation of the beam pitch.

Meanwhile, the optical scanning device executes so-called auto power control (APC) that monitors the light emission amount of the light emitting portion and controls a supplied current (or applied voltage) to cause the light emission amount to become the desired constant light amount. However, when the light source is a multiple beam light source having plural light emitting portions, even though the light emission amounts between the light emitting portions are constant, an optical path of each light beam that passes through an optical system is different. As a result, the light amount difference may be generated between light spots on the photosensitive drum, due to the transmittance change in optical components and birefringence in the optical components.

3. Regarding Reciprocity Failure

The reciprocity failure means a phenomenon of "reciprocity" where "a sensitivity characteristic of a photoreceptor is the same when exposure energy (=light amount×exposure time) is constant being not realized.

When the exposure energy is constant, if the light amount increases, the sensitivity (latent image depth) decreases. This is generated in the case where, if the light amount increases, the recombination amount of carriers increases and the amount of carriers reaching a surface decreases.

As shown in FIG. 29, when the photosensitive drum is collectively exposed by the four light beams, if a place A to be simultaneously exposed and a place B to be exposed in a one scanning time are compared with each other, the exposure energy in the place A is the same as the exposure energy in the place B. However, since one-time scanning light amount in the place A is more than one-time scanning light amount in the place B, the sensitivity is lowered due to the reciprocity failure, as shown in FIG. 30.

In this case, the high density is generally easily generated in a joint (portion corresponding to the place B). In this case, whether the reciprocity failure is easily generated depends on a characteristic of a photoreceptor and the scanning speed.

FIG. 31(A) shows the case where the four light beams (bm1 to bm4) are deflected on the same deflected reflection surface of the polygon mirror and are simultaneously exposed. FIG. 31(B) shows the case where the two light beams (bm1 and bm2) and the two light beams (bm3 to bm4) are deflected on the different deflected reflection surfaces of the polygon mirror and are exposed at different times. In the case of FIG. 31(B), in a region S where the light beam bm2 and the light beam bm3 overlap each other, the density becomes higher than the density of the other overlapping region.

Therefore, in regards to the sub-scanning direction, the exposure range based on the four light beams in the case of FIG. 31(B) becomes narrower than that in the case of FIG. 31(A). As a result, the density of one pixel is periodically changed according to scanning and this becomes a generation factor of the banding.

For this reason, technologies for decreasing the density difference between the scanning lines based on the reciprocity failure are suggested (for example, see Japanese Patent Application Laid-open No. 2002-113903 and Japanese Patent Application Laid-open No. 2007-196460).

Further, Japanese Patent Application Laid-open No. 2008-170640, Japanese Patent Application Laid-open No. H10-221903, Japanese Patent Application Laid-open No. 2000-037904, and Japanese Patent Application Laid-open No. 2009-029115 disclose technologies for decreasing banding.

However, in a latent image forming apparatus that is disclosed in Japanese Patent Application Laid-open No. 2002-113903 and a scanning exposure device that is disclosed in Japanese Patent Application Laid-open No. 2007-196460, the banding that is generated due to the deviation of the beam pitch is not considered.

In image forming apparatuses that are disclosed in Japanese Patent Application Laid-open No. 2008-170640 and Japanese Patent Application Laid-open No. H10-221903, the banding that is generated due to the deviation of the beam pitch is not considered.

In an image recording apparatus that disclosed in Japanese Patent Application Laid-open No. 2000-037904, banding in the case where the number of channels of laser beams is not a common multiple of the number of unit pixels of pattern dither cannot be decreased.

In an image forming apparatus that is disclosed in Japanese Patent Application Laid-open No. 2009-029115, the banding that is generated due to the deviation of the beam pitch is not considered.

According to the present invention, when one pixel is formed by at least two light beams, banding that is generated due to the deviation of the beam pitch can be decreased.

According to the present invention, since the image forming apparatus includes the optical scanning device, a high-quality image can be formed at a high speed.

SUMMARY OF THE INVENTION

It is an object of the present invention to at least partially solve the problems in the conventional technology.

According to an aspect of the present invention, there is provided an optical scanning device that is used in an image forming apparatus where one pixel is formed by at least two light beams and scans a scanned surface of the image forming apparatus in a main scanning direction by the light beams, the optical scanning device including: a light source that has a plurality of light emitting portions arranged at the different positions in at least a sub-scanning direction; and a control device that controls a driving state of at least one light emitting portion included in a combination of the light emitting portions to emit at least the two light beams to form one pixel, among the plurality of light emitting portions, according to a positional relationship between at least the two light emitting portions included in the combination in the sub-scanning direction.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a first diagram showing an optical system before a deflector;

FIG. 4 is a second diagram showing the optical system before the deflector;

FIG. 12 a diagram showing a relationship between combinations of pixel forming light emitting portions and correction and non-correction of the deviation of the beam pitch in FIG. 10;

FIG. 17 is a diagram showing combinations of pixel forming light emitting portions in FIG. 15;

FIG. 18 is a diagram showing a relationship between combinations of the pixel forming light emitting portions and a degree of the density irregularity based on the deviation of the beam pitch in FIG. 15;

FIG. 19 is a diagram showing a relationship between the deviation amount of the beam pitch and correction data in FIG. 15;

FIG. 20 is a diagram showing correction data to decrease banding generated due to a reciprocity failure in FIG. 15;

FIG. 21 is a diagram showing an arrangement state of plural light emitting portions in a light source that is used in multiple exposure scanning;

DETAILED DESCRIPTION OF THE PREFERRED EMBODIMENTS

Figure 1:
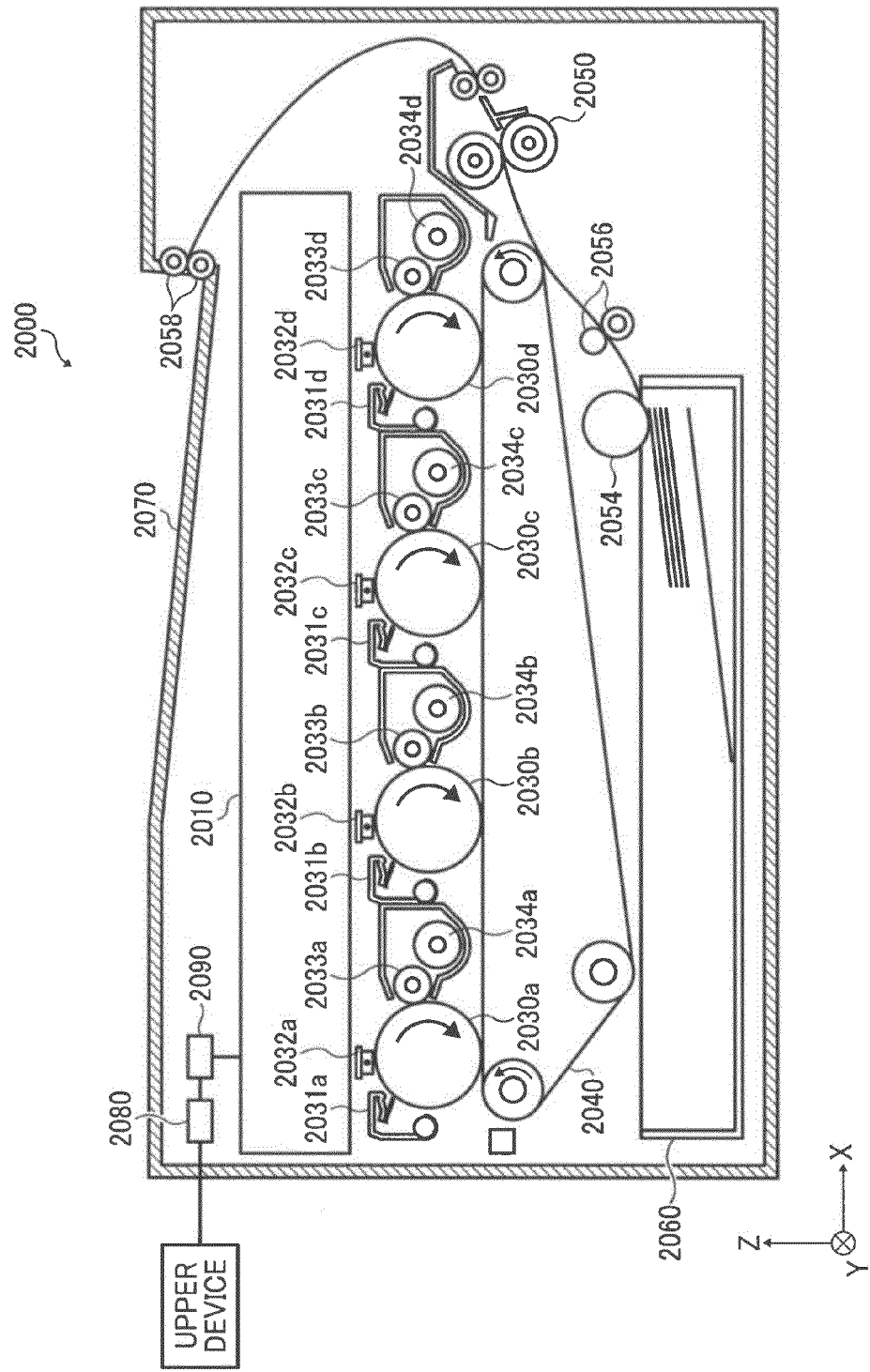
FIG. 1 is a diagram showing the schematic configuration of a color printer according to an embodiment of the present invention.
Figure 2:
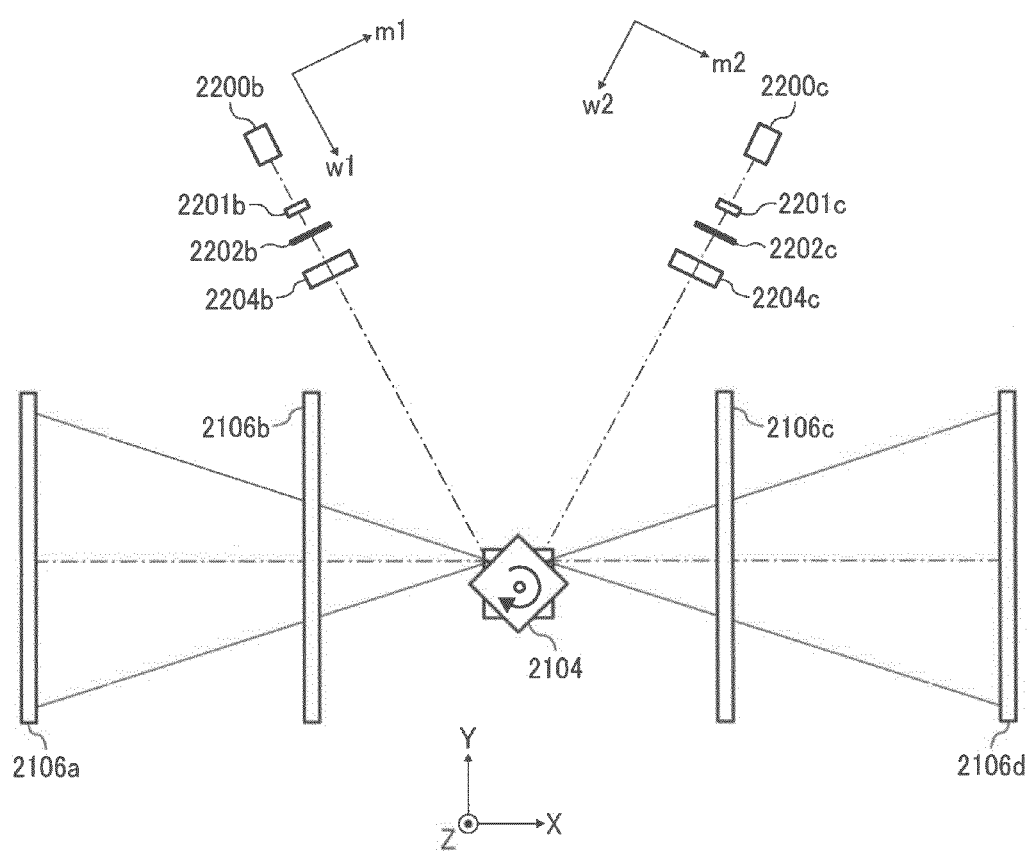
FIG. 2 is a diagram showing an optical scanning device shown in FIG. 1.
Figure 5:
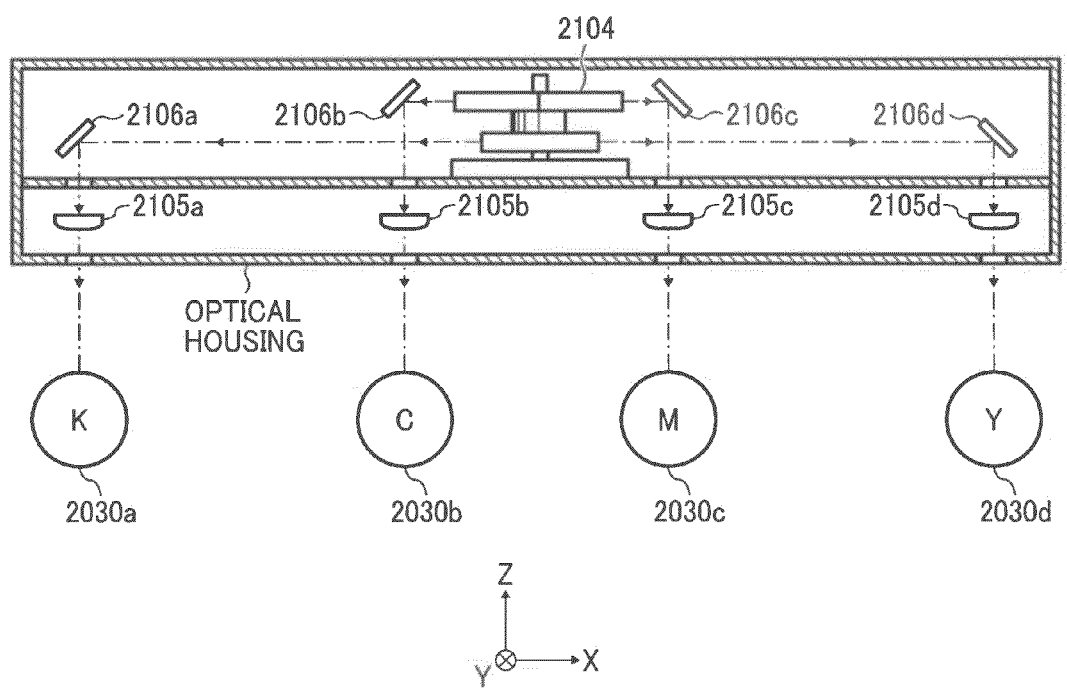
FIG. 5 is a diagram showing a scanning optical system.

Hereinafter, an embodiment of the present invention will be described on the basis of FIGS. 1 to 23B. FIG. 1 shows the schematic diagram of a color printer 2000 that functions as an image forming apparatus according to the embodiment.

The color printer 2000 is a multiple color printer of a tandem system that overlaps four colors (black, cyan, magenta, and yellow) and forms a full color image. The color printer 2000 includes an optical scanning device 2010, four photosensitive drums 2030a, 2030b, 2030c, and 2030d, four cleaning units 2031a, 2031b, 2031c, and 2031d, four electrostatic chargers 2032a, 2032b, 2032c, and 2032d, four developing rollers 2033a, 2033b, 2033c, and 2033d, four toner cartridges 2034a, 2034b, 2034c, and 2034d, a transfer belt 2040, a fixing roller 2050, a feed roller 2054, a resist roller pair 2056, a discharge roller 2058, a feed tray 2060, a discharge tray 2070, a communication control device 2080, and a printer control device 2090 to wholly control the various units.

In the following description, in an XYZ three-dimensional orthogonal coordinate system, a direction along a longitudinal direction of each photosensitive drum is used as a Y-axis direction and a direction along a direction where the photosensitive drums are arranged is used as an X-axis direction.

The communication control device 2080 controls bidirectional communication with an upper device (for example, personal computer) through a network and so on.

On a surface of each photosensitive drum, a photosensitive layer is formed. That is, the surface of each photosensitive drum is the scanned surface. Each photosensitive drum rotates in an arrow direction in a plane in FIG. 1 by a rotating mechanism not shown in the drawings.

In the vicinity of the surface of the photosensitive drum 2030a, the electrostatic charger 2032a, the developing roller 2033a, and the cleaning unit 2031a are disposed along a rotation direction of the photosensitive drum 2030a.

The photosensitive drum 2030a, the electrostatic charger 2032a, the developing roller 2033a, the toner cartridge 2034a, and the cleaning unit 2031a are used as a set and constitute an image forming station (hereinafter, also called a "K station" for convenience of description) to form a black image.

In the vicinity of the surface of the photosensitive drum 2030b, the electrostatic charger 2032b, the developing roller 2033b, and the cleaning unit 2031b are disposed along a rotation direction of the photosensitive drum 2030b.

The photosensitive drum 2030b, the electrostatic charger 2032b, the developing roller 2033b, the toner cartridge 2034b, and the cleaning unit 2031b are used as a set and constitute an image forming station (hereinafter, also called a "C station" for convenience of description) to form a cyan image.

In the vicinity of the surface of the photosensitive drum 2030c, the electrostatic charger 2032c, the developing roller 2033c, and the cleaning unit 2031c are disposed along a rotation direction of the photosensitive drum 2030c.

The photosensitive drum 2030c, the electrostatic charger 2032c, the developing roller 2033c, the toner cartridge 2034c, and the cleaning unit 2031c are used as a set and constitute an image forming station (hereinafter, also called a "M station" for convenience of description) to form a magenta image.

In the vicinity of the surface of the photosensitive drum 2030d, the electrostatic charger 2032d, the developing roller 2033d, and the cleaning unit 2031d are disposed along a rotation direction of the photosensitive drum 2030d.

The photosensitive drum 2030d, the electrostatic charger 2032d, the developing roller 2033d, the toner cartridge 2034d, and the cleaning unit 2031d are used as a set and constitute an image forming station (hereinafter, also called a "Y station" for convenience of description) to form a yellow image.

Each electrostatic charger charges the surface of the corresponding photosensitive drum with uniformity.

The optical scanning device 2010 illuminates the surface of the corresponding charged photosensitive drum by a light beam modulated for each color, on the basis of image information (black image information, cyan image information, magenta image information, and yellow image information) of the multiple colors from the upper device. Thereby, on the surface of each photosensitive drum, the charges are lost by a portion illuminated by the light, and a latent image corresponding to the image information is formed on the surface of each photosensitive drum. In this case, the formed latent image moves in a direction of the corresponding developing roller according to the rotation of the photosensitive drum. The configuration of the optical scanning device 2010 will be described below.

In each photosensitive drum, a region where image information is written is called an effective scanning region or an image forming region.

A black toner is stored in the toner cartridge 2034a and is supplied to the developing roller 2033a. A cyan toner is stored in the toner cartridge 2034b and is supplied to the developing roller 2033b. A magenta toner is stored in the toner cartridge 2034c and is supplied to the developing roller 2033c. A yellow toner is stored in the toner cartridge 2034d and is supplied to the developing roller 2033d.

On the surface of each developing roller, the toner from the corresponding toner cartridge is thinly and equally coated. If the toner of the surface of each developing roller contacts the surface of the corresponding photosensitive drum, the toner is moved by a portion of the surface illuminated by the light and is adhered to the corresponding portion. That is, each developing roller adheres the toner to the latent image formed on the surface of the corresponding photosensitive drum and develops the latent image. In this case, an image (hereinafter, also called a "toner image") where the toner is adhered moves in a direction of the transfer belt 2040 according to the rotation of the photosensitive drum.

The yellow, magenta, cyan, and black toner images are sequentially transferred to the transfer belt 2040 at predetermined timing and are overlapped to each other, and a color image is formed.

In the feed tray 2060, recording paper is stored. The feed roller 2054 is disposed in the vicinity of the feed tray 2060, and the feed roller 2054 extracts the record paper from the feed tray 2060 one by one and conveys the record paper to the resist roller pair 2056. The resist roller pair 2056 feeds the record paper to the transfer belt 2040 at the predetermined timing. Thereby, the color image on the transfer belt 2040 is transferred to the record paper. In this case, the transferred record paper is fed to the fixing roller 2050.

In the fixing roller 2050, the heat and the pressure are applied to the record paper. As a result, the toner is fixed on the record paper. In this case, the record paper where the toner is fixed is fed to the discharge tray 2070 through the discharge roller 2058 and is sequentially stacked on the discharge tray 2070.

Each cleaning unit removes the toner (remaining toner) that remains on the surface of the corresponding photosensitive drum. The surface of the photosensitive drum where the remaining toner is removed returns to the position facing the corresponding electrostatic charger.

Next, the configuration of the optical scanning device 2010 will be described.

Figure 8:
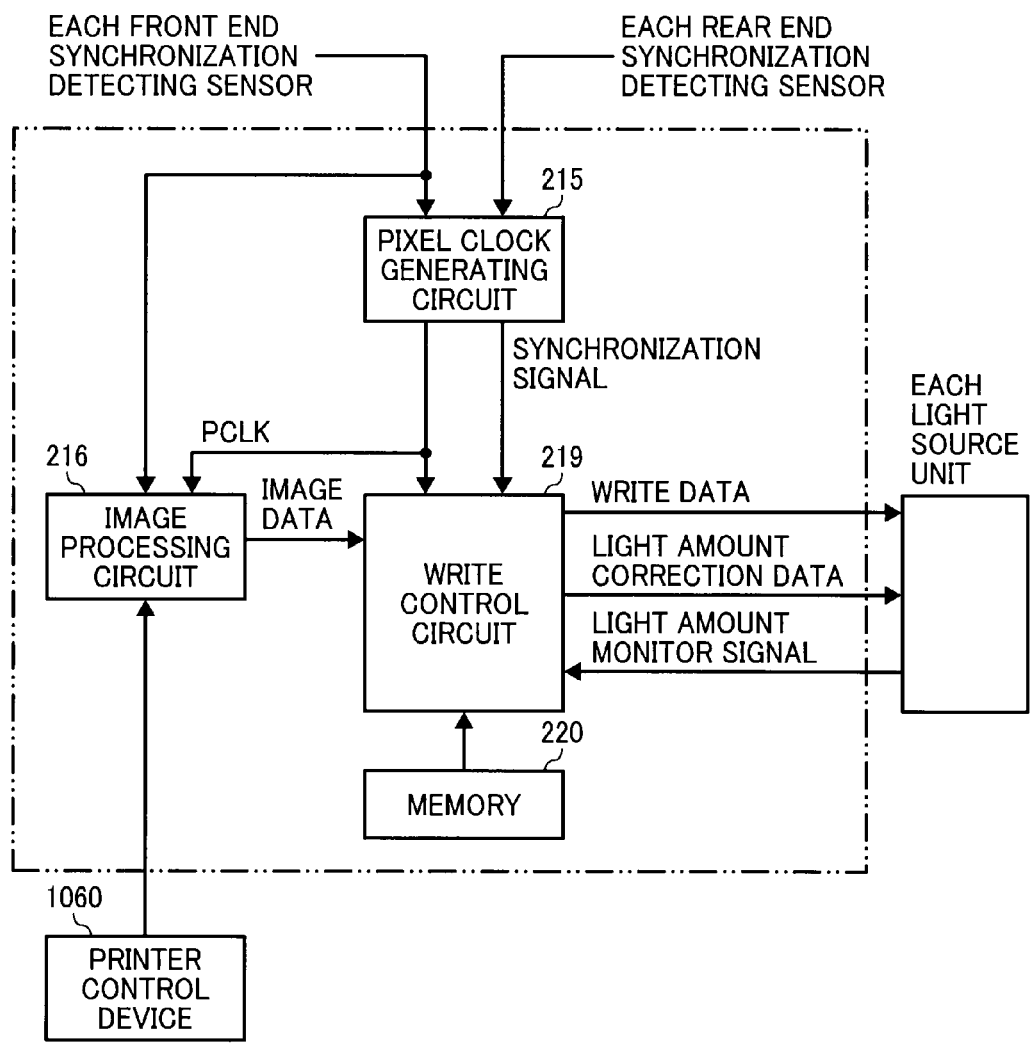
FIG. 8 is a block diagram showing the configuration of a scanning control device.

For example, as shown in FIGS. 2 to 5, the optical scanning device 2010 includes four light sources 2200a, 2200b, 2200c, and 2200d, four coupling lenses 2201a, 2201b, 2201c, and 2201d, four opening plates 2202a, 2202b, 2202c, and 2202d, four cylindrical lenses 2204a, 2204b, 2204c, and 2204d, a polygon mirror 2104, four scanning lenses 2105a, 2105b, 2105c, and 2105d, four folding mirrors 2106a, 2106b, 2106c, and 2106d, and a scanning control device (not shown, see FIG. 8). The optical elements are stored in an optical housing.

A direction along optical axes of the coupling lenses 2201a and 2201b is set to a "w1 direction" and a direction along optical axes of the coupling lenses 2201c and 2201d is set to a "w2 direction." A direction that is orthogonal to a Z-axis direction and the w1 direction is set to a "m1 direction" and a direction that is orthogonal to the Z-axis direction and the w2 direction is set to a "m2 direction".

In the following description, for convenience of description, a direction that corresponds to a main scanning direction is simply called a "main scanning corresponding direction" and a direction that corresponds to a sub-scanning direction is simply called a "sub-scanning corresponding direction."

The main scanning corresponding direction in the light sources 2200a and 2200b is the m1 direction and the main scanning corresponding direction in the light sources 2200c and 2200d is the m2 direction. The sub-scanning corresponding direction in the light sources 2200a and 2200b and the sub-scanning corresponding direction in the light sources 2200c and 2200d are the same direction as the Z-axis direction.

The light source 2200b and the light source 2200c are disposed at the positions apart from each other in the X-axis direction. The light source 2200a is disposed on the –Z side of the light source 2200b. The light source 2200d is disposed on the –Z side of the light source 2200c.

The coupling lens 2201a is disposed on an optical path of a light beam emitted from the light source 2200a and converts the light beam into an approximately parallel light beam.

The coupling lens 2201b is disposed on an optical path of a light beam emitted from the light source 2200b and converts the light beam into an approximately parallel light beam.

The coupling lens 2201c is disposed on an optical path of a light beam emitted from the light source 2200c and converts the light beam into an approximately parallel light beam.

The coupling lens 2201d is disposed on an optical path of a light beam emitted from the light source 2200d and converts the light beam into an approximately parallel light beam.

The opening plate 2202a has an opening and shapes the light beam that is transmitted through the coupling lens 2201a.

The opening plate 2202b has an opening and shapes the light beam that is transmitted through the coupling lens 2201b.

The opening plate 2202c has an opening and shapes the light beam that is transmitted through the coupling lens 2201c.

The opening plate 2202d has an opening and shapes the light beam that is transmitted through the coupling lens 2201d.

Figure 6:
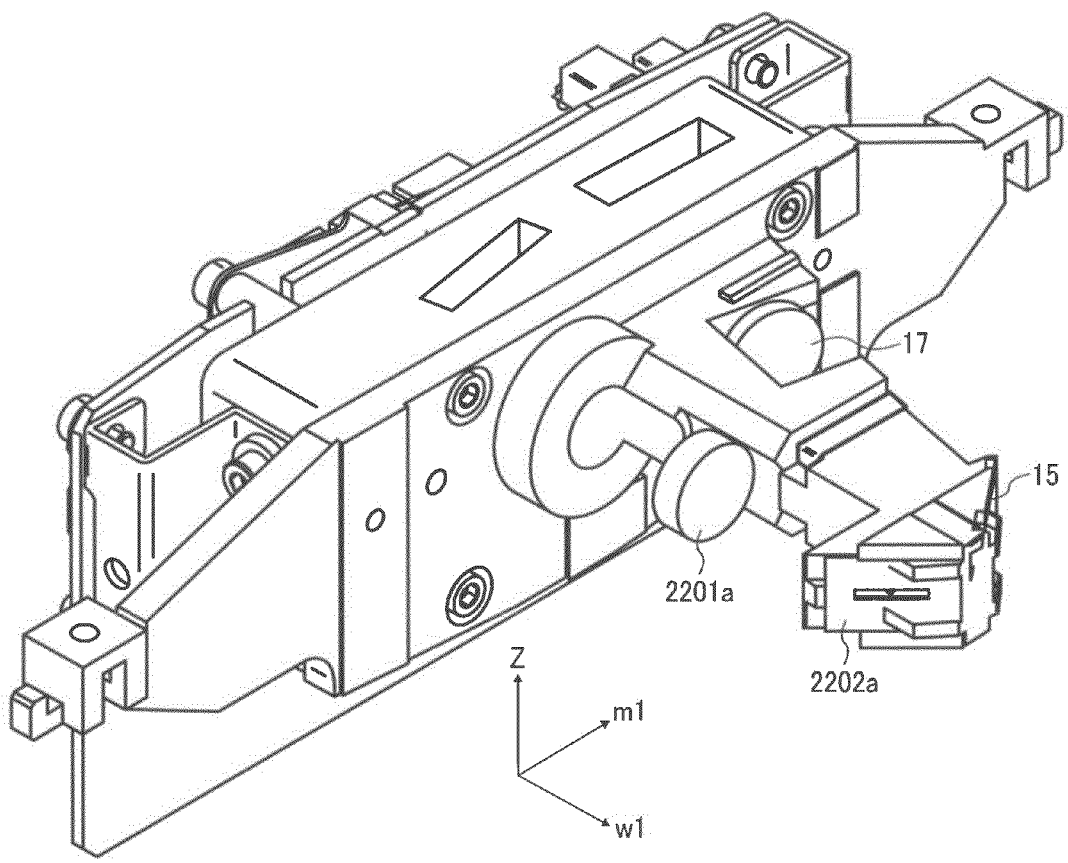
FIG. 6 is a first diagram showing a light source unit.
Figure 7:
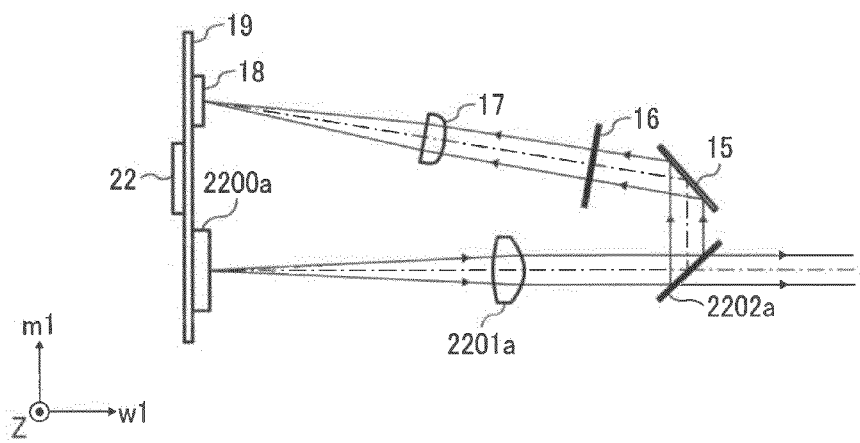
FIG. 7 is a second diagram showing the light source unit.

For example, as shown in FIGS. 6 and 7, the light source 2200a, the coupling lens 2201a, and the opening plate 2202a are hold in a holder with a predetermined positional relationship and constitute a unit. This unit is called a "light source unit".

The light source unit has further has a monitor light reflection mirror 15, a second opening plate 16, a collecting lens 17, a light receiving element 18, and a light source driving chip 22.

The light source 2200a, the light receiving element 18, and the light source driving chip 22 are mounted on a same circuit board 19.

Since the opening plate 2202a uses light reflected around the opening as monitor light, the opening plate 2202a is disposed to be inclined to a virtual surface orthogonal to the optical axis of the coupling lens 2201a.

The monitor light reflection mirror 15 reflects the monitor light reflected by the opening plate 2202a in a direction toward the light receiving element 18.

The second opening plate 16 defines a beam diameter of the monitor light that is reflected by the monitor light reflection mirror 15. The size and the shape of the opening of the second opening plate 16 are determined according to the size and the shape of the opening of the opening plate 2202a.

The collecting lens 17 collects the monitor light that is transmitted through the opening of the second opening plate 16.

The light receiving element 18 receives the monitor light. The light receiving element 18 outputs a signal (photoelectric conversion signal) according to the light reception amount.

An optical system that is disposed on an optical path of the monitor light beam between the opening plate 2202a and the light receiving element 18 is called a monitor optical system. In this embodiment, the monitor optical system includes the monitor light reflection mirror 15, the second opening plate 16, and the collecting lens 17.

The light source 2200b, the coupling lens 2201b, and the opening plate 2202b also constitute a unit, similar to the above case.

The light source 2200c, the coupling lens 2201c, and the opening plate 2202c also constitute a unit, similar to the above case.

The light source 2200d, the coupling lens 2201d, and the opening plate 2202d also constitute a unit, similar to the above case.

Referring back to FIG. 3, the cylindrical lens 2204a is disposed on an optical path of a light beam La that is transmitted through the opening of the opening plate 2202a and images the light beam in the vicinity of a deflected reflection surface of the polygon mirror 2104 in the Z-axis direction.

The cylindrical lens 2204b is disposed on an optical path of a light beam Lb that is transmitted through the opening of the opening plate 2202b and images the light beam in the vicinity of a deflected reflection surface of the polygon mirror 2104 in the Z-axis direction.

As shown in FIG. 4, cylindrical lens 2204c is disposed on an optical path of a light beam Lc that is transmitted through the opening of the opening plate 2202c and images the light beam in the vicinity of a deflected reflection surface of the polygon mirror 2104 in the Z-axis direction.

The cylindrical lens 2204d is disposed on an optical path of a light beam Ld that is transmitted through the opening of the opening plate 2202d and images the light beam in the vicinity of a deflected reflection surface of the polygon mirror 2104 in the Z-axis direction.

The polygon mirror 2104 has a four surface mirror of a two-step structure that rotates around an axis parallel to the Z axis, and each mirror becomes a deflected reflection surface. In the four surface mirror of the first step (lower step), a light beam from the cylindrical lens 2204a and a light beam from the cylindrical lens 2204d are deflected. In the four surface mirror of the second step (upper step), a light beam from the cylindrical lens 2204b and a light beam from the cylindrical lens 2204c are deflected. The four surface mirror of the first step and the four surface mirror of the second step rotate in a state where phases thereof are shifted by 45° and write scanning is alternately performed in the first and second steps.

In this case, the light beams from the cylindrical lenses 2204a and 2204b are deflected to the −X side of the polygon mirror 2104 and the light beams from the cylindrical lenses 2204c and 2204d are deflected to the +X side of the polygon mirror 2104.

Therefore, the light beam from the cylindrical lens 2204a that is deflected by the polygon mirror 2104 illuminates the photosensitive drum 2030a through the folding mirror 2106a and the scanning lens 2105a and a light spot is formed. The light spot moves in a longitudinal direction of the photosensitive drum 2030a according to the rotation of the polygon mirror 2104. That is, the photosensitive drum 2030a is scanned. At this time, a movement direction of the light spot is a "main scanning direction" in the photosensitive drum 2030a and a rotation direction of the photosensitive drum 2030a is a "sub-scanning direction" in the photosensitive drum 2030a.

Further, the light beam from the cylindrical lens 2204b that is deflected by the polygon mirror 2104 illuminates the photosensitive drum 2030b through the folding mirror 2106b and the scanning lens 2105b and a light spot is formed. The light spot moves in a longitudinal direction of the photosensitive drum 2030b according to the rotation of the polygon mirror 2104. That is, the photosensitive drum 2030b is scanned. At this time, a movement direction of the light spot is a "main scanning direction" in the photosensitive drum 2030b and a rotation direction of the photosensitive drum 2030b is a "sub-scanning direction" in the photosensitive drum 2030b.

Further, the light beam from the cylindrical lens 2204c that is deflected by the polygon mirror 2104 illuminates the photosensitive drum 2030c through the folding mirror 2106c and the scanning lens 2105c and a light spot is formed. The light spot moves in a longitudinal direction of the photosensitive drum 2030c according to the rotation of the polygon mirror 2104. That is, the photosensitive drum 2030c is scanned. At this time, a movement direction of the light spot is a "main scanning direction" in the photosensitive drum 2030c and a rotation direction of the photosensitive drum 2030c is a "sub-scanning direction" in the photosensitive drum 2030c.

Further, the light beam from the cylindrical lens 2204d that is deflected by the polygon mirror 2104 illuminates the photosensitive drum 2030d through the folding mirror 2106d and the scanning lens 2105d and a light spot is formed. The light spot moves in a longitudinal direction of the photosensitive drum 2030d according to the rotation of the polygon mirror 2104. That is, the photosensitive drum 2030d is scanned. At this time, a movement direction of the light spot is a "main scanning direction" in the photosensitive drum 2030d and a rotation direction of the photosensitive drum 2030d is a "sub-scanning direction" in the photosensitive drum 2030d.

The individual folding mirrors are disposed such that optical paths reaching from the polygon mirror to the individual photosensitive drums become matched with each other and the incident positions and the incident angles of the light beams in the individual photosensitive drums become equal to each other.

In each station, a surface tilt correction optical system that causes a surface of the corresponding photosensitive drum and a deflection point in the polygon mirror 2104 to be a conjugate relation in the sub-scanning direction is configured by the cylindrical lens and the scanning lens.

The optical system that is disposed between the polygon mirror 2104 and each photosensitive drum is also called a scanning optical system. In this embodiment, a scanning optical system of the K station that includes the scanning lens 2105a and the folding mirror 2106a, a scanning optical system of the C station that includes the scanning lens 2105b and the folding mirror 2106b, a scanning optical system of the M station that includes the scanning lens 2105c and the folding mirror 2106c, and a scanning optical system of the Y station that includes the scanning lens 2105d and the folding mirror 2106d are configured.

Meanwhile, in the scanning optical system of each station, a tip end synchronization detecting sensor (not shown in the drawings) on which a light beam before write start in one-time scanning is incident and a rear end synchronization detecting sensor (not shown in the drawings) after write end in one-time scanning is incident are provided.

Each synchronization detecting sensor has a light receiving element and outputs an electric signal according to the light reception amount to the scanning control device. An output signal of the tip end synchronization detecting sensor is also called a tip end synchronization detection signal. An output signal of the rear end synchronization detecting sensor is also called a rear end synchronization detection signal.

For example, as shown in FIG. 8, the scanning control device has a pixel clock generating circuit 215, an image processing circuit 216, a write control circuit 219, and a memory 220. An arrow in FIG. 8 shows a flow of a representative signal or information and does not show an entire connection relationship between all of the blocks.

The pixel clock generating circuit 215 generates a pixel clock signal for each station. The pixel clock generating circuit 215 calculates a time needed to scan the light beam between the synchronization detecting sensors, from the output signal from the tip end synchronization detecting sensor and the output signal from the rear end synchronization detecting sensor, for each station, and sets a reference frequency of the pixel clock signal again, such that pulses of the predetermined number are collected in the time. The output signal from the tip end synchronization detecting sensor is output to the write control circuit 219 as a synchronization signal.

The image processing circuit 216 executes raster development on corresponding image information received from the upper device through a printer control device 1060, executes predetermined halftone processing, and generates dot data representing a gray-scale level of one pixel based on a pixel clock signal PCLK, for each station. If the scanning start is detected on the basis of the output signal from the corresponding tip end synchronization detecting sensor, for each station, the image processing circuit 216 outputs dot data to the write control circuit 219 in synchronization with the pixel clock signal PCLK.

The write control circuit 219 generates write data on the basis of the corresponding dot data from the image processing circuit 216, the corresponding pixel clock signal PCLK from the pixel clock generating circuit 215, and the synchronization signal, for each station. In this case, the generated write data is output to the corresponding light source unit.

The write control circuit 219 generates correction data to correct the light amount of each light emitting portion to cause the amount of light emitted from the light source unit to become a desired value, on the basis of the output signal from the light receiving element at the predetermined timing, for each light source unit. That is, the write control circuit 219 executes auto power control (APC).

The write control circuit 219 reads the correction data to correct the light amount according to the combination of the pixel forming light emitting portions, from the memory 220, for each scanning in each station. In this case, the read correction data is overlapped to the correction data in the APC and is output to the corresponding light source unit as new light amount correction data.

In each light source unit, a light source driving chip generates a driving signal of each light emitting portion, on the basis of the write data and the light amount correction data from the scanning control device.

Each light source has an array light emitting element where the plural light emitting portions are formed on one substrate.

The plural light emitting portions are arranged such that the intervals of the light emitting portions become the same, when all of the light emitting portions are orthogonally projected onto a virtual line extending in the sub-scanning direction. In this specification, the "interval of the light emitting portions" is the distance between the centers of the two light emitting portions.

In this case, each light emitting portion is vertical cavity surface emitting laser (VCSEL) where the oscillation wavelength is at the band of 780 nm. That is, the array light emitting element is a so-called surface emitting laser array.

In the color printer 2000, one pixel is formed by plural light beams.

In this case, banding that is generated when one pixel is formed by the plural light beams will be described.

When one pixel is formed by the plural light beams, as compared with when one pixel is formed by one light beam, the unintentional periodic density change is generated due to the following three factors.

Factor 1: deviation of the beam pitch that is the deviation from an idea value of the interval in the sub-scanning direction of each light spot on a surface image Factor 2: light amount difference of the plural light beams Factor 3: reciprocity failure Meanwhile, examples of a scanning method that is used when the surface of the photosensitive drum is scanned by the plural light beams include (1) so-called "adjacent scanning" to write the plural light beams not to be overlapped to a light illumination region at the time of previous scanning, (2) so-called "multiple exposure scanning" to write the plural light beams to be partially overlapped to the light illumination region at the time of the previous scanning, and (3) so-called "interlacing scanning" to write the plural light beams between plural scanning lines at the time of the previous scanning.

The adjacent scanning is a scanning method that is most widely adopted and does not cause a problem when the number of light emitting portions is small. However, when the number of light emitting portions increases, the density irregularity based on the reciprocity failure is easily viewed in the adjacent scanning.

The multiple exposure scanning is advantageous when the surface emitting laser array is used as the light source, because the light amount per beam is half the common light amount.

With respect to the vibration, the rotational change of the photosensitive drum, and the mechanical factor such as the tilt of the polygon mirror among the generation factors of the banding, since the density change can be dispersed by two-time scanning, the banding can be decreased. Meanwhile, when one pixel is formed by the plural light beams, the combinations of the pixel forming light emitting portions are sequentially changed. As a result, the banding is easily generated due to the deviation of the beam pitch or the light amount difference.

The light amount per beam in the interlacing scanning is the same as that in the adjacent scanning. However, since the interval of the light emitting portions in the light source can be increased, thermal and electrical crosstalk can be prevented from being generated between the light emitting portions. Similar to the multiple exposure scanning, the interlacing scanning is advantageous in suppressing generation of the banding due to the mechanical factor. However, in the interlacing scanning, the banding is easily generated due to the deviation of the beam pitch or the light amount difference.

<Formation of an Image Based on Adjacent Scanning>

Next, the case where an image is formed by the adjacent scanning will be described.

Figure 9:
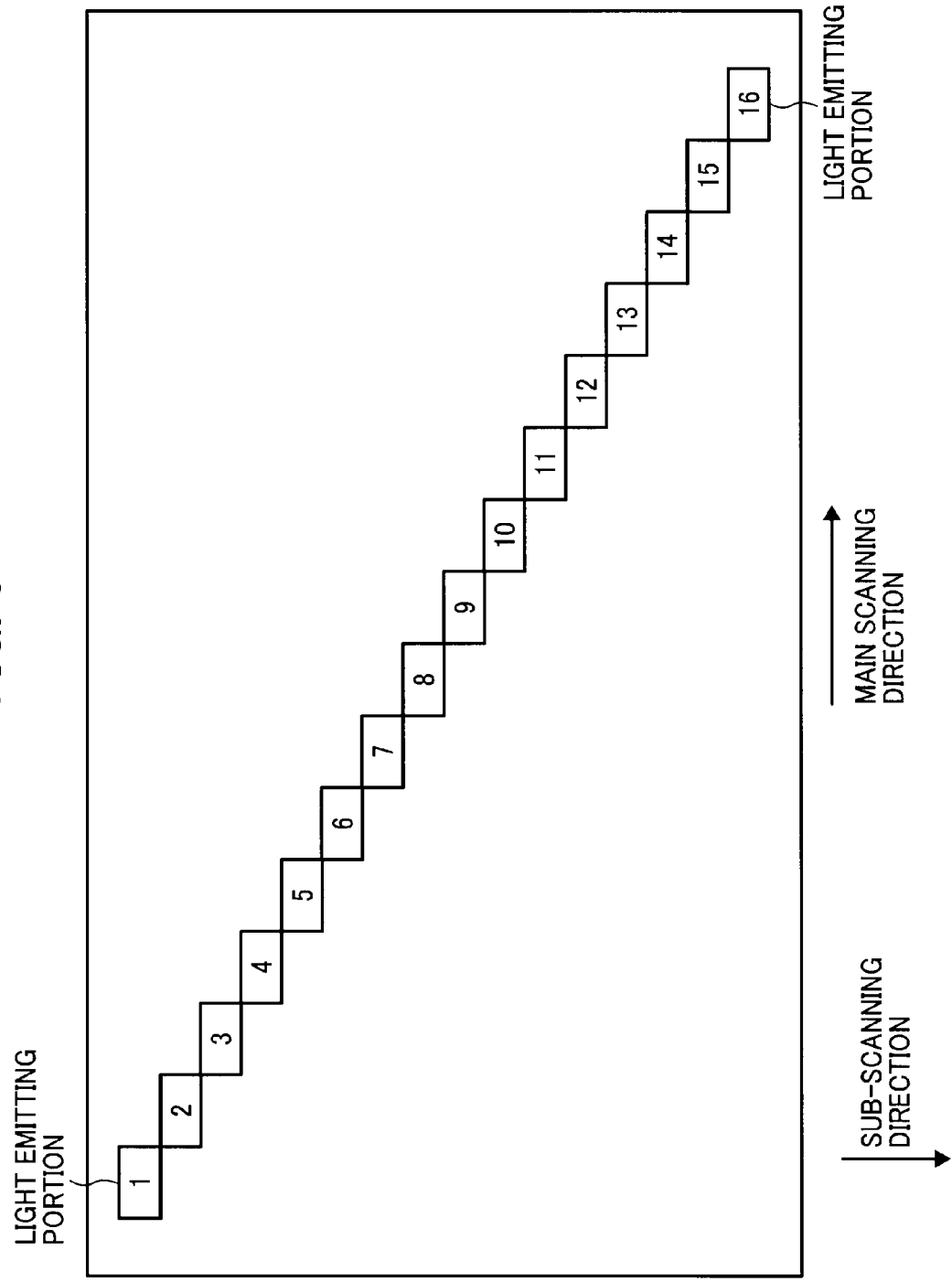
FIG. 9 is a diagram showing an arrangement state of plural light emitting portions in a light source that is used in adjacent scanning.

For example, as shown in FIG. 9, a light source has 16 light emitting portions ch1 to ch16 and the light emitting portions are disposed linearly along a direction inclined to the main scanning corresponding direction and the sub-scanning corresponding direction.

Figure 10B:
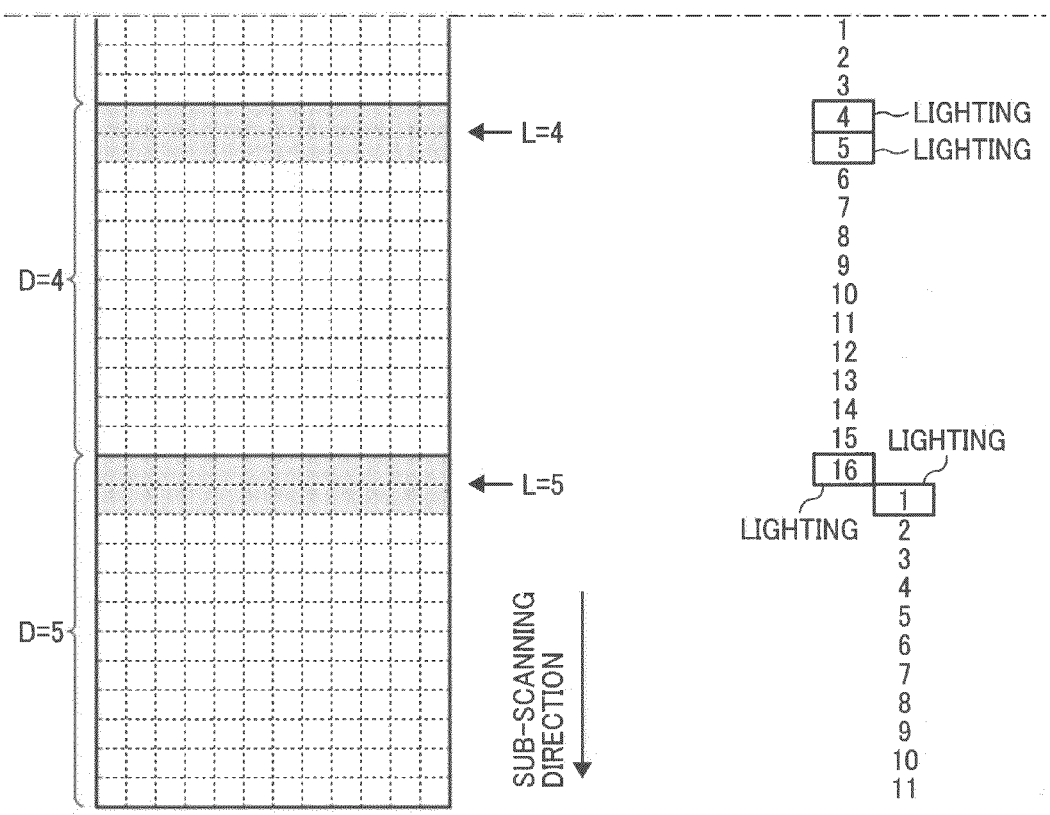
FIG. 10 is a diagram showing the adjacent scanning.

As shown in FIG. 10, one pixel is formed by two light beams and a dither matrix represents 36 gray-scale levels of 6×6. In FIG. 10, the pixel density of one pixel is 1200 dpi (dot per inch) and the density of horizontal parallel lines is 200 lpi (line per inch). The write density per light beam is 2400 dpi.

When a latent image of L=1 corresponding to a first dot line is formed on the photosensitive drum by two light beams of a light beam from the light emitting portion ch16 and a light beam from the light emitting portion ch1, one dot line is formed by two-time scanning by lighting (turning on) the light emitting portion ch16 by the first scanning and lighting the light emitting portion ch1 by the second scanning.

Similar to the case of L=1, one dot line that is formed by the light beam from the light emitting portion ch16 and the light beam from the light emitting portion ch1 is L=5 (fifth line). That is, a combination of the pixel forming light emitting portions becomes periodically the same for every four dot lines.

In the light source where the plural light emitting portions are linearly arranged, the deviation of the beam pitch may be generated due to the deviation of the rotation of the light source and the deviation of the magnification of the optical system.

Figure 11A:
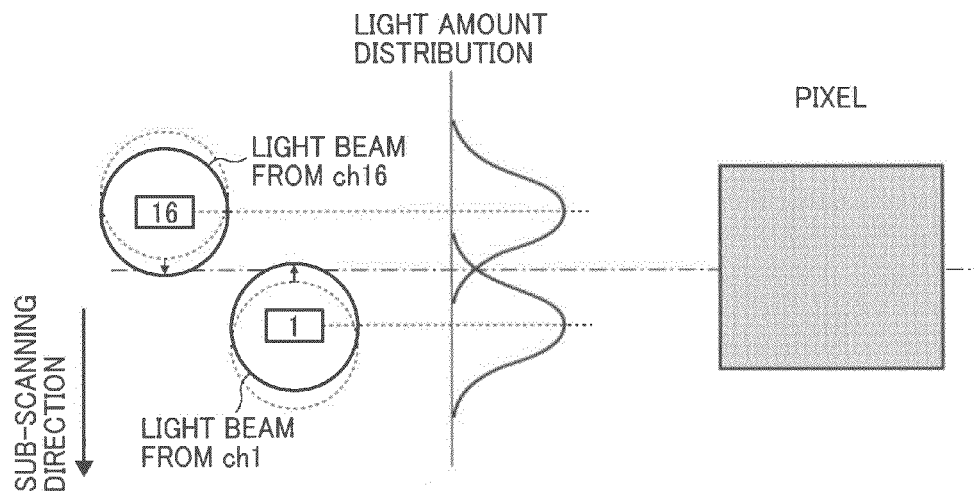
FIGS. 11A and 11B are diagrams showing the deviation of the beam pitch in FIG. 10.
Figure 11B:
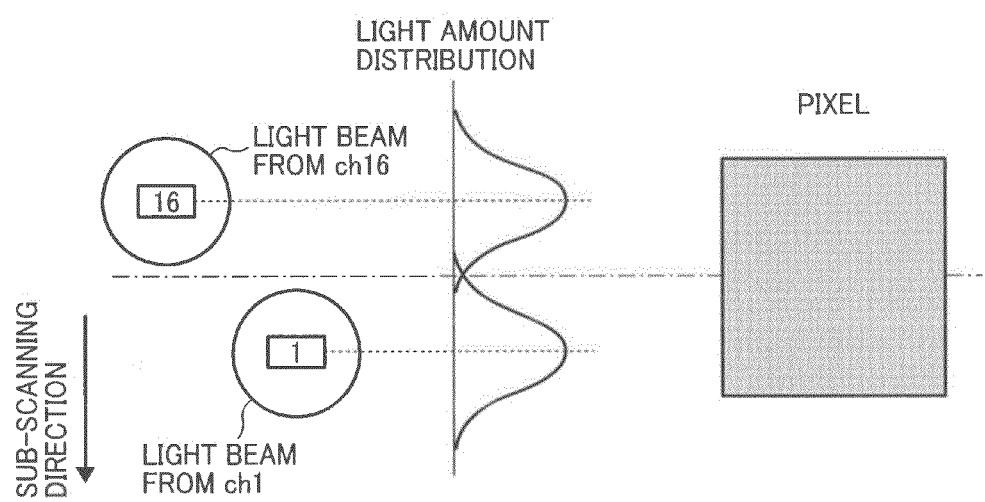

For example, as shown in FIG. 11A, if the light beam from the light emitting portion ch16 and the light beam from the light emitting portion ch1 are shifted in a direction of an arrow from the ideal position (see FIG. 11B), the width of the sub-scanning direction of one pixel that is formed by the two light beams changes (decreases in this case), and reproducibility of one pixel is deteriorated.

If the reproducibility of one pixel is deteriorated, when images of horizontal parallel lines are formed or an image of a halftone is formed by the dither, pixels where a combination of the pixel forming light emitting portions becomes the same periodically appear in the sub-scanning direction. In particular, an abnormal image that is called the banding is generated.

The human visual sensitivity is different depending on a period and about 1 line/mm becomes a peak in general. If the density irregularity with the period of about 1 line/mm is generated, banding notably appears and becomes the abnormal image.

When the number of light emitting portions is 16 and one pixel is formed by the two light beams, if ON/OFF of the light emitting portions is included, light emitting patterns of 32 kinds exist.

However, the combinations of the pixel forming light emitting portions other than (ch16, ch1) are (ch1, ch2), (ch2, ch3), . . . , (ch14, ch15), and (ch15, ch16) and are combinations of the light emitting portions adjacent to each other. Therefore, the deviation of the beam pitch is very small as compared with (ch16, ch1) and correction is not needed.

Even in the combination of (ch16, ch1), the pixel is easily collapsed only when the two light emitting portions are lighted. Therefore, correction is made only when both the light emitting portion ch16 and the light emitting portion ch1 are lighted (turned on) in the combination of (ch16, ch1) (see FIG. 12).

The correction data is set such that the gravity center position (strength center position) of a synthesis light beam and the line width (pixel width) of one pixel in the sub-scanning direction become ideal values. However, even though the pixel width in the sub-scanning direction can be matched with the ideal value, if total energy of the synthesis light beam greatly changes, the pixel width in the main scanning direction changes. Therefore, the change amount of the total energy of the synthesis light beam is preferably ±20% or less of the change amount before correction.

In this case, the light amount distribution f(x) per light beam in the sub-scanning direction is represented by a line spread function (LSF). If the light amount distribution is almost a Gaussian distribution, the light amount distribution can be represented by the following equation 1.

$$f(x) = \frac{1}{\sqrt{2\pi}\cdot\sigma}e^{-\frac{(x-\mu)^2}{2\sigma^2}} \quad (1)$$

Figures 13, 14:
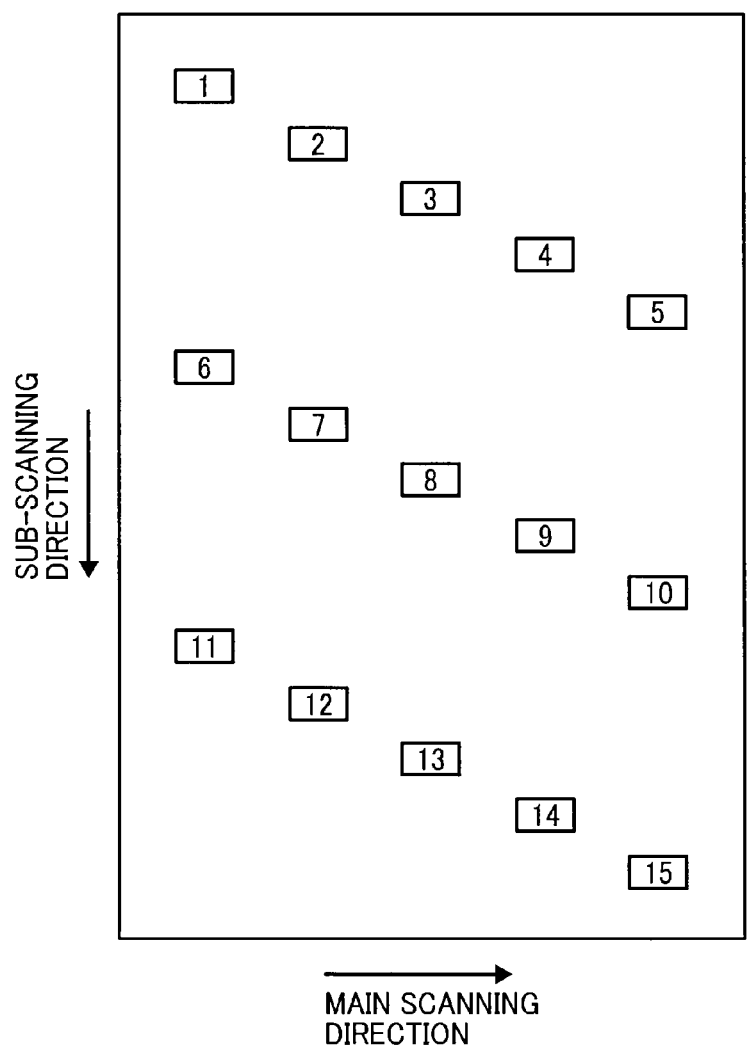
FIG. 13 is a relationship between the deviation amount of the beam pitch and correction data in FIG. 10.
FIG. 14 is a diagram showing an arrangement state of plural light emitting portions in a light source that is used in interlacing scanning.

For example, correction data of the deviation of the beam pitch when a state where the spot diameter of one light spot is defined as $1/e^2$ and the spot diameters of the light spots are set to 60 μm, and the spot diameters of the light spot based on the light emitting portion ch16 and the light spot based on the light emitting portion ch1 in the sub-scanning direction are apart from each other by 1200 dpi (21 μm) is set as an ideal state is shown in FIG. 13.

For example, when the interval of the light spot based on the light beam from the light emitting portion ch16 and the light spot based on the light beam from the light emitting portion ch1 is narrower than the ideal interval by 4 μm, the light amounts of the light emitting portions ch16 and ch1 become 1.08 times of initial setting values. Thereby, a synthesis light beam that is almost equal to a synthesis light beam in the case where the deviation of the beam pitch is not generated can be obtained. The change amount of the total energy in the synthesis light beam can be maintained at ±20% or less, and an influence (pixel width and density reproducibility) on the main scanning direction can be suppressed not to cause a problem.

Before the optical scanning device 2010 is mounted in the color printer 2000, the beam pitch is measured, and a relationship of the deviation amount of the beam pitch and the change amount of the latent image width in the sub-scanning direction and the light amount to correct the change of the latent image width are calculated by theoretical calculation or an experiment and are used as correction data of the deviation of the beam pitch.

After the optical scanning device 2010 may be mounted in the color printer 2000, the banding density may be measured from an output image, correction data of the light amount to decrease the density change may be calculated from the measured result, and the correction data may be used as correction data of the deviation of the beam pitch.

The correction data of the deviation of the beam pitch is stored in the memory 220 of the scanning control device in a table format for each combination of the pixel forming light emitting portions.

The light amount difference of the individual light beams may be corrected together. In this case, before the optical scanning device 2010 is mounted in the color printer 2000, the light amount of each light beam is measured and correction data of the light amount difference is calculated for each combination of the pixel forming light emitting portions, on the basis of a measured value. The correction data of the light amount difference is stored in the memory 220 in the table format for each combination of the pixel forming light emitting portions.

When one pixel is formed by plural scanning, the reciprocity failure is generated. For this reason, an influence of the reciprocity failure may be previously measured from the output image or the latent image potential on the photoreceptor, and the influence and the deviation of the beam pitch may be corrected.

When the number of light emitting portions in the light source increases, a generation period of the density irregularity is lengthened, and the density irregularity based on the reciprocity failure is easily viewed. For example, when the number of light emitting portions is two and the light emitting portions are arranged at an interval of 600 dpi, the generation period of the density irregularity is 0.085 mm and is rarely viewed. However, when the number of light emitting portions is 16 and the light emitting portions are arranged at an interval of 1200 dpi, the generation period of the density irregularity is 0.33 mm. As a result, since a density region comes close to a region where the human visual sensitivity is high, the density irregularity is easily viewed.

In this case, when the combination of the pixel forming light emitting portions is (ch1 and ch16), the density increases. Therefore, when the combination of the pixel forming light emitting portions is (ch1 and ch16), correction data to decrease the light amounts of the light emitting portions ch1 and ch16 is calculated by the theoretical calculation and is stored in the memory 220.

Specifically, when a write signal is generated and the combination of the pixel forming light emitting portions is (ch1 and ch16), the write control circuit 219 reads correction data of the deviation of the beam pitch, correction data of the light amount difference, and correction data of the reciprocity failure from the memory 220, overlaps the correction data to correction data of the APC, and outputs the overlapped data to the corresponding light source unit as light amount correction data. Thereby, banding based on the deviation of the beam pitch, banding based on the light amount difference, and banding based on the reciprocity failure can be decreased.

<Formation of an Image Based on Interlacing Scanning>

Next, the case where an image is formed by the interlacing scanning will be described.

For example, as shown in FIG. 14, a light source has 15 light emitting portions ch1 to ch15 and the light emitting portions are disposed two-dimensionally.

Figure 15B:
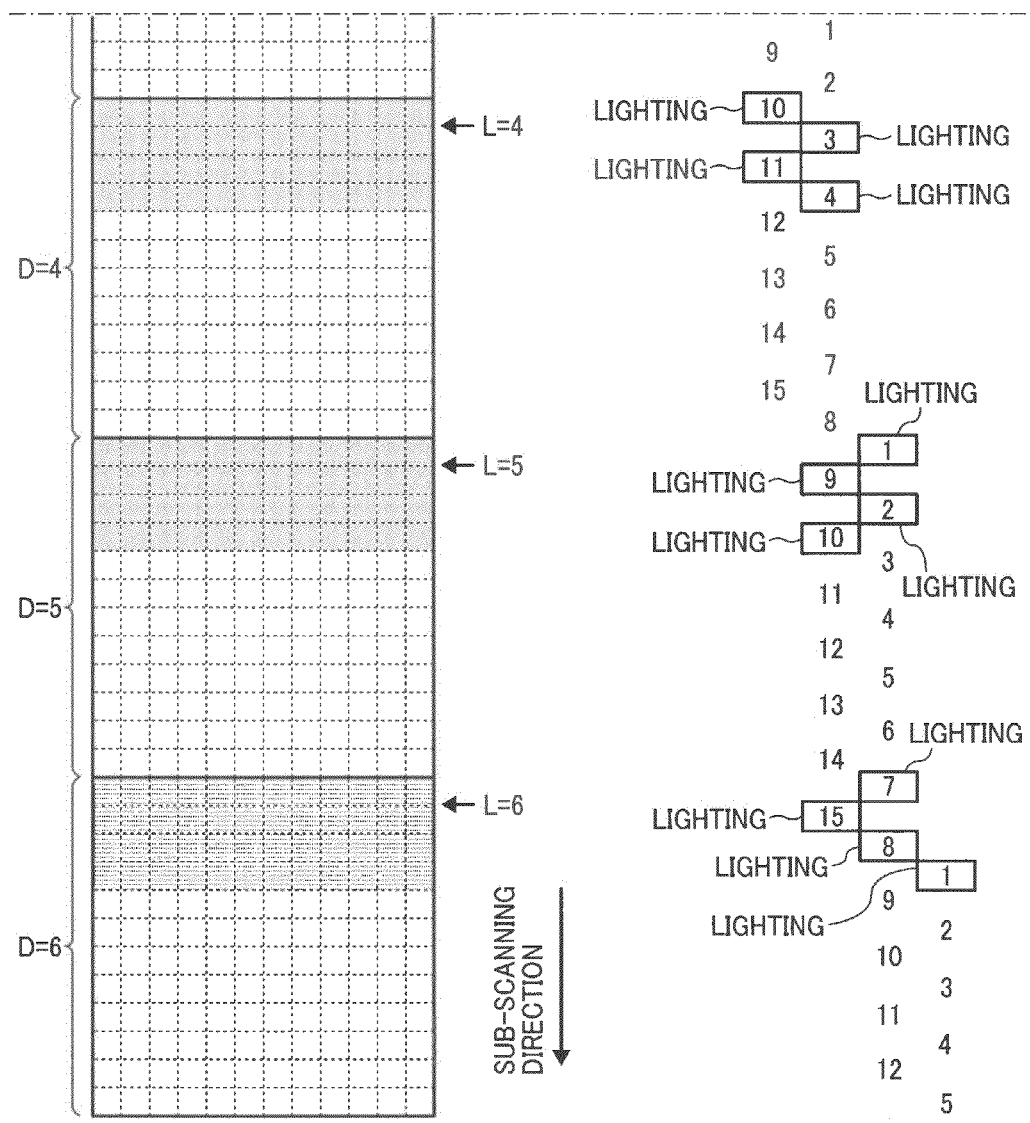
FIG. 15 is a diagram showing the interlacing scanning.

As shown in FIG. 15, one pixel is formed by four light beams and a dither matrix represents 9 gray-scale levels of 3×3. In FIG. 15, the pixel density of one pixel is 600 dpi and the density of horizontal parallel lines is 200 lpi. The write density per light beam is 2400 dpi.

When a latent image of L=1 corresponding to a first dot line is formed on the photosensitive drum by four light beams of a light beam from the light emitting portion ch15, a light beam from the light emitting portion ch7, a light beam from the light emitting portion ch8, and a light beam from the light emitting portion ch1, one dot line is formed by three-time scanning by lighting (turning on) the light emitting portion ch15 by the first scanning, lighting (turning on) the light emitting portions ch7 and ch8 by the second scanning, and lighting (turning on) the light emitting portion ch1 by the third scanning.

Similar to the case of L=1, one dot line that is formed by the light beam from the light emitting portion ch15, the light beam from the light emitting portion ch7, the light beam from the light emitting portion ch8, and the light beam from the light emitting portion ch1 is L=6 (sixth line). That is, a combination of the pixel forming light emitting portions becomes periodically the same for every five dot lines.

When a latent image of L=2 corresponding to a second dot line is formed by four light beams from the light emitting portions ch13, ch14, ch6, and ch7, one dot line is formed by two-time scanning by lighting (turning on) the light emitting portions ch13 and ch14 by the first scanning and lighting (turning-on) the light emitting portions ch6 and ch7 by the second scanning.

As such, the case where one dot line is formed by the two-time scanning and the case where one dot line is formed by the three-time scanning are mixed according to the combinations of the pixel forming light emitting portions.

In the light source where the plural light emitting portions are arranged two-dimensionally, the deviation of the beam pitch may be generated due to the deviation of the rotation of the light source and the deviation of the magnification of the optical system, similar to the light source where the plural light emitting portions are linearly arranged.

The deviation of the beam pitch in the light source where the plural light emitting portions are arranged two-dimensionally is more complicated than deviation of the beam pitch in the light source where the plural light emitting portions are linearly arranged.

When the plural light emitting portions are arranged as shown in FIG. 14, if the light source rotates around a central axis, in regards to the change of the distance in the sub-scanning corresponding direction, the change of the distance between the light emitting portions ch5 and ch6 becomes more than the change of the distance between the light emitting portions ch6 and ch7.

Since the light emitting portions ch1 and ch15 are positioned at both ends of the sub-scanning corresponding direction, the change of the distance between the light emitting portions ch1 to ch15 is greatly affected by the change of the magnification of the optical system.

Figure 16A:
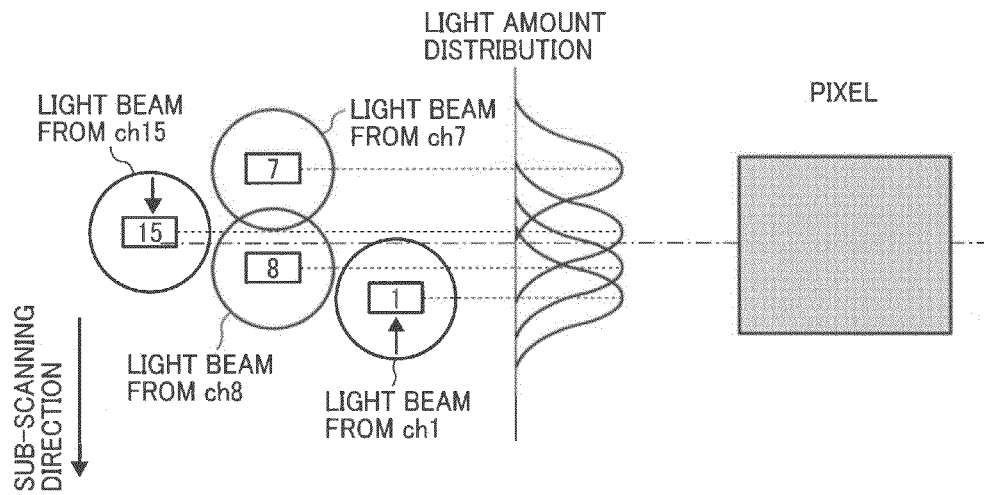
FIGS. 16A and 16B are diagrams showing the deviation of the beam pitch in FIG. 15.
Figure 16B:
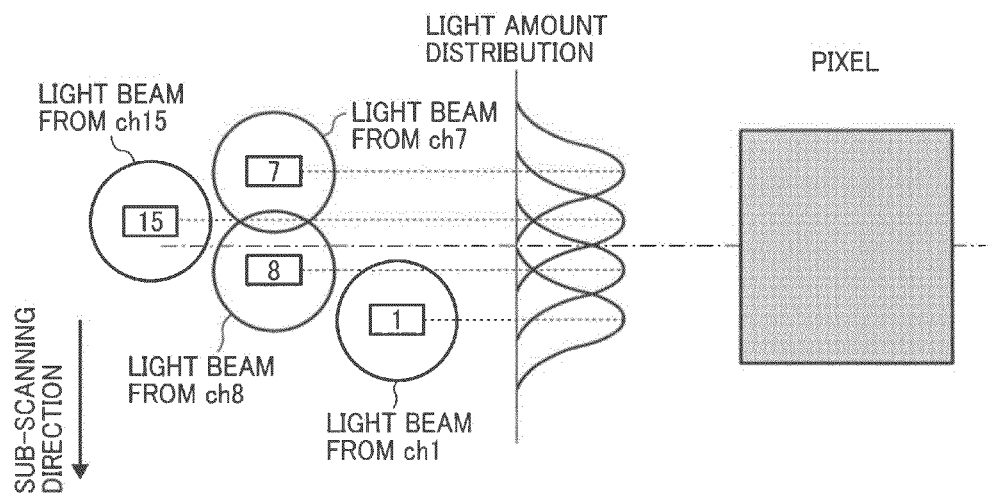

If the magnification of the optical system increases, as shown in FIG. 16A, the light spot based on the light beam from the light emitting portion ch15 and the light spot based on the light beam from the light emitting portion ch1 are shifted in a direction of an arrow from the ideal position (see FIG. 16B). Since the light beam from the light emitting portion ch7 and the light beam from the light emitting portion ch8 pass through a peripheral portion of an optical axis of the optical system, an influence of the change of the magnification of the optical system is small. Thereby, the width of the sub-scanning direction of one pixel that is formed by the four light beams changes (decreases in this case), reproducibility of one pixel is deteriorated, and banding is easily generated.

When the number of light emitting portions is 15 and one pixel is formed by the four light beams, if ON/OFF of the light emitting portions is included, light emitting patterns of 225 kinds exist.

The correction data can be stored in the memory 220 for each combination of the pixel forming light emitting portions. However, since generation of the correction data becomes complicated and the memory capacity increases, correction data is preferably generated as simple as possible.

The combinations of the pixel forming light emitting portions are shown in FIG. 17. In FIG. 18, a combination (in particular, the case where a combination of ch1 and ch15 exists) where notable banding is easily generated is shown by "O" and a combination (the case where beam pitch of 8 beams or more exists) where slight banding is easily generated is shown by "Δ".

In this case, only the combinations of the four kinds where the notable banding is easily generated are corrected and the other combinations are not corrected.

The correction data is set such that the gravity center position (strength center position) of a synthesis light beam and the line width (pixel width) of one pixel in the sub-scanning direction become ideal values. However, even though the pixel width in the sub-scanning direction can be matched with the ideal value, if total energy of the synthesis light beam greatly changes, the pixel width in the main scanning direction changes. Therefore, the change amount of the total energy of the synthesis light beam is preferably ±20% or less of the change amount before correction.

For example, correction data of the deviation of the beam pitch when the spot diameter of one light spot is defined as $1/e^2$ and the spot diameters of the light spots are set to 78 μm is shown in FIG. 19.

For example, when the interval of the light spot based on the light beam from the light emitting portion ch15 and the light spot based on the light beam from the light emitting portion ch1 is narrower than the ideal interval by 4 μm, the light amount of the light emitting portion ch15 becomes 0.89 times of an initial setting value, the light amount of the light emitting portion ch7 becomes 1.19 times of an initial setting value, the light amount of the light emitting portion ch8 becomes 0.74 times of an initial setting value, and the light amount of the light emitting portion ch1 becomes 1.19 times of an initial setting value. Thereby, a synthesis light beam that is almost equal to a synthesis light beam in the case where the deviation of the beam pitch is not generated can be obtained. The change amount of the total energy in the synthesis light beam can be maintained at ±20% or less, and an influence (pixel width and density reproducibility) on the main scanning direction can be suppressed not to cause a problem.

In particular, when one pixel is formed by five light beams or more, a degree of freedom where the gravity center position (strength center position) of a synthesis light beam and the line width of one pixel in the sub-scanning direction are corrected while total energy is constantly maintained is high. In FIG. 19, the change amount of the total energy is suppressed at ±1% or less, and an influence (pixel width and density reproducibility) on the main scanning direction can be ignored. The change amount of the total energy where an influence (pixel width and density reproducibility) on the main scanning direction can be ignored is ±5% or less.

Before the optical scanning device 2010 is mounted in the color printer 2000, the beam pitch is measured for each combination of the pixel forming light emitting portions, and a relationship of the deviation amount of the beam pitch and the change amount of the latent image width and the light amount to correct the change of the latent image width are calculated by theoretical calculation or an experiment and are used as correction data of the deviation of the beam pitch.

After the optical scanning device 2010 may be mounted in the color printer 2000, the banding density may be measured from an output image, correction data of the light amount to decrease the density change may be calculated from the measured result, and the correction data may be used as correction data of the deviation of the beam pitch.

The correction data of the deviation of the beam pitch is stored in the memory 220 of the scanning control device in a table format for each combination of the pixel forming light emitting portions.

The light amount difference of the individual light beams may be corrected together. In this case, before the optical scanning device 2010 is mounted in the color printer 2000, the light amount of each light beam is measured and correction data of the light amount difference is calculated for each combination of the pixel forming light emitting portions, on the basis of the measured value. The correction data of the light amount difference is stored in the memory 220 in the table format for each combination of the pixel forming light emitting portions.

When one pixel is formed by plural scanning, the reciprocity failure is generated. For this reason, an influence of the reciprocity failure may be previously measured from the output image or the latent image potential on the photoreceptor, and the influence and the deviation of the beam pitch may be corrected.

In this case, since the interlacing scanning is executed, one pixel is formed by executing scanning two times or more. However, when one pixel is formed by three-time scanning and the light beams are adjacent to each other, this case is easily affected by the reciprocity failure.

Therefore, as shown in FIG. 20, only when the combinations of the pixel forming light emitting portions are the combinations A and B, an influence of the reciprocity failure is corrected. For example, when one pixel is formed by the light beams from the light emitting portions, ch15, ch17, ch8, and ch1, the light beam from the light emitting portion ch8 and the light beam from the light emitting portion ch1 are scanned at the adjacent positions and the density easily increases. Therefore, the increase of the density of one pixel can be suppressed by decreasing the light amounts of the light emitting portions ch8 and ch1 by 0.95 times of the initial setting values.

<Formation of an Image Based on Multiple Exposure Scanning>

Next, the case where an image is formed by the multiple exposure scanning will be described.

For example, as shown in FIG. 21, a light source has 16 light emitting portions ch1 to ch16 and the light emitting portions are disposed two-dimensionally.

Figure 22A:
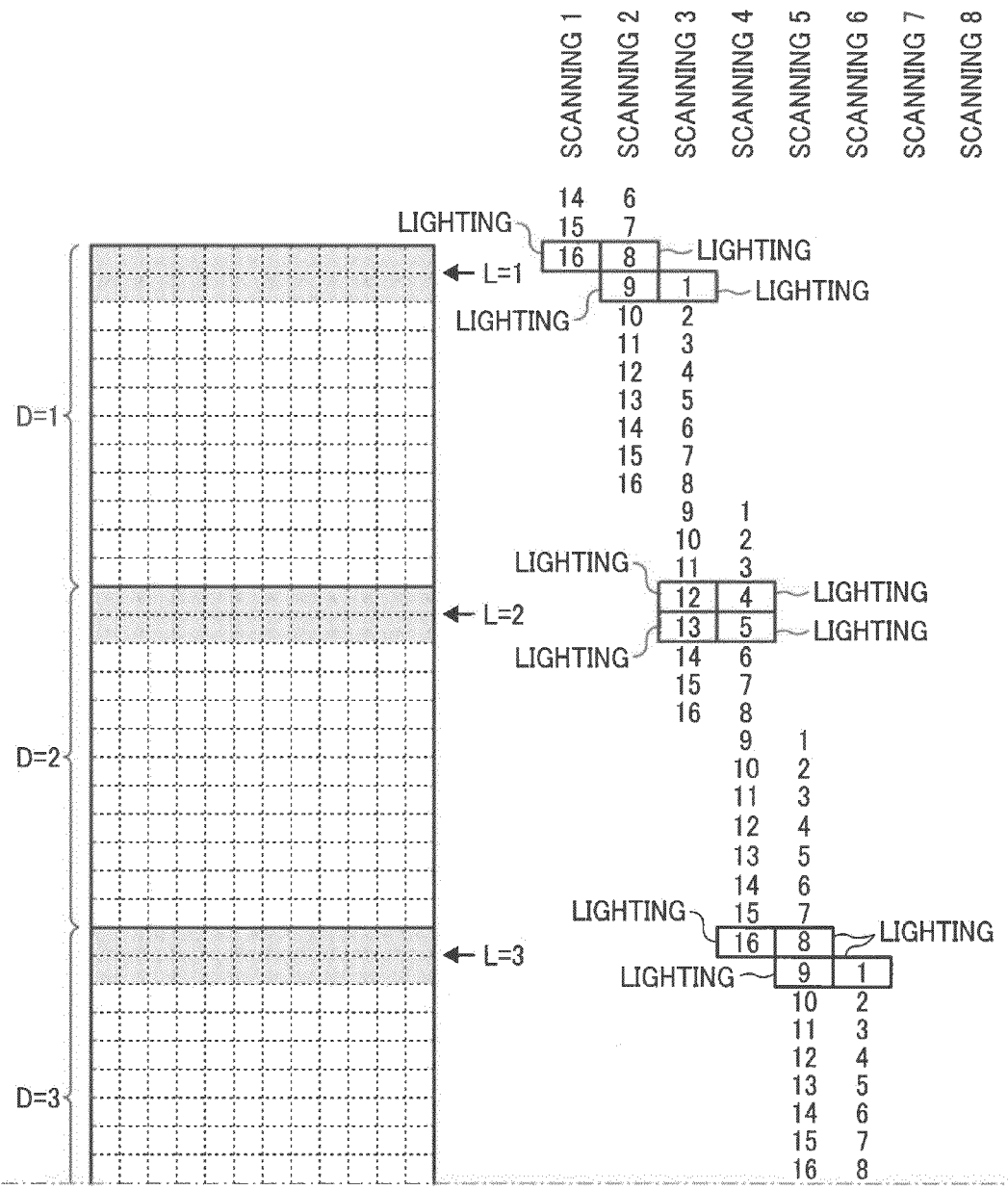
FIG. 22 is a diagram showing the multiple exposure scanning.
Figure 22B:
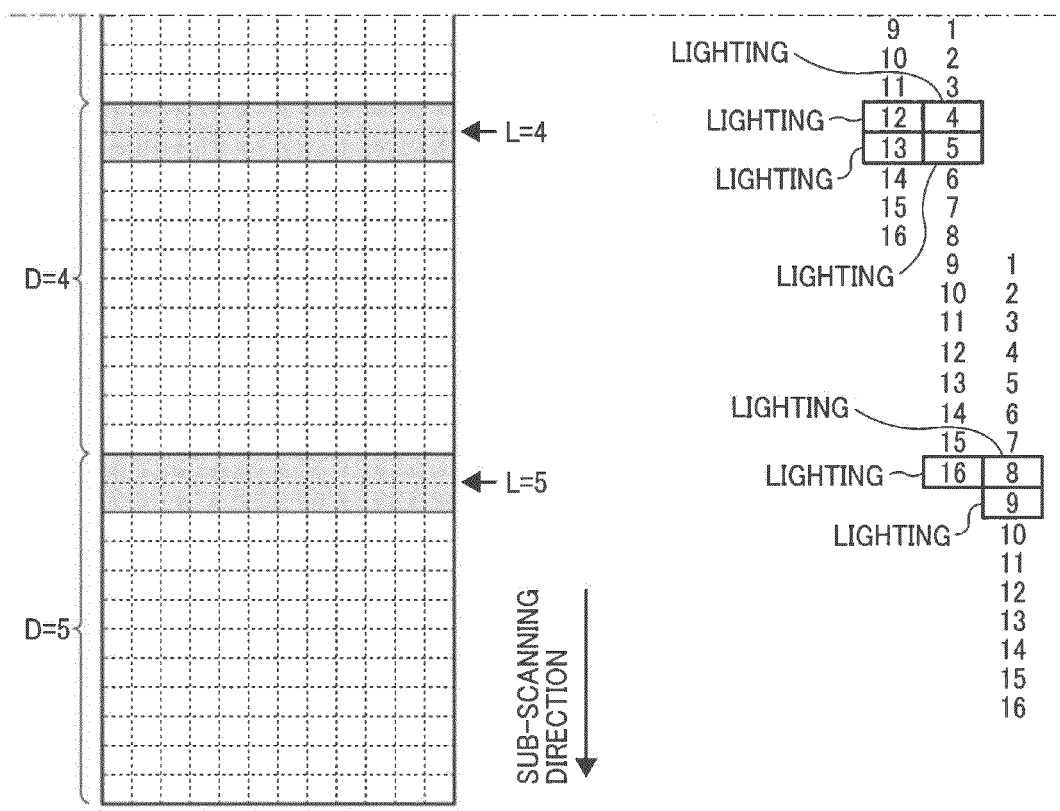
Figure 23A:
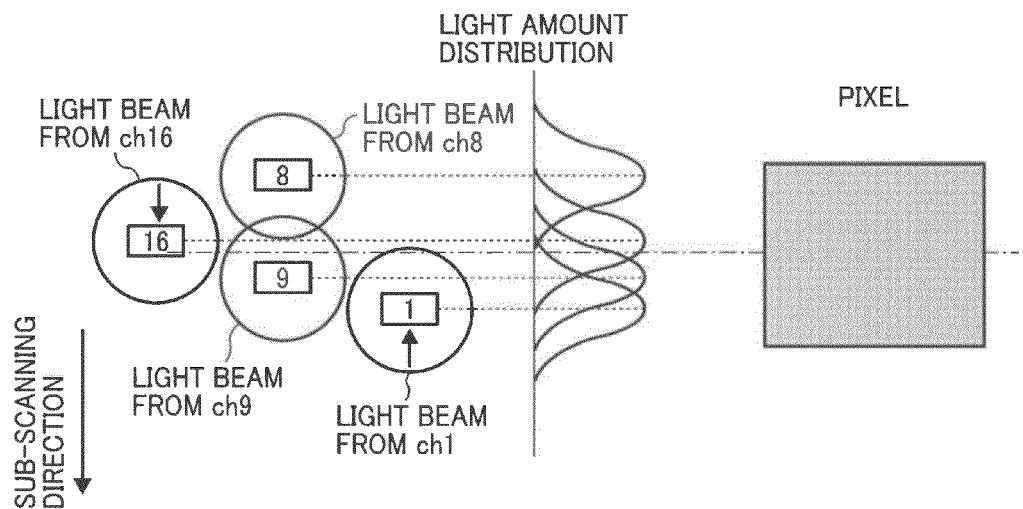
FIGS. 23A and 23B are diagrams showing the deviation of the beam pitch in FIG. 22.
Figure 23B:
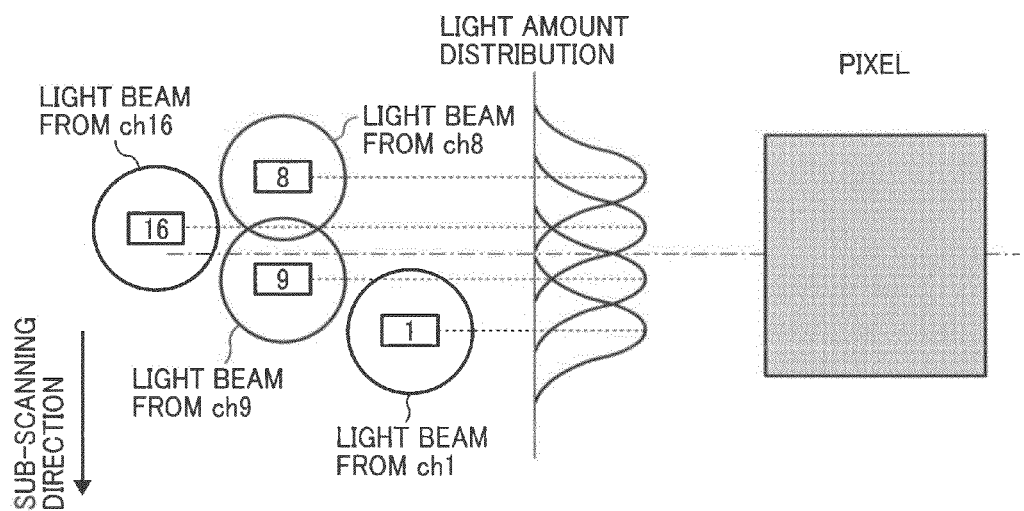
Figures 24, 25:
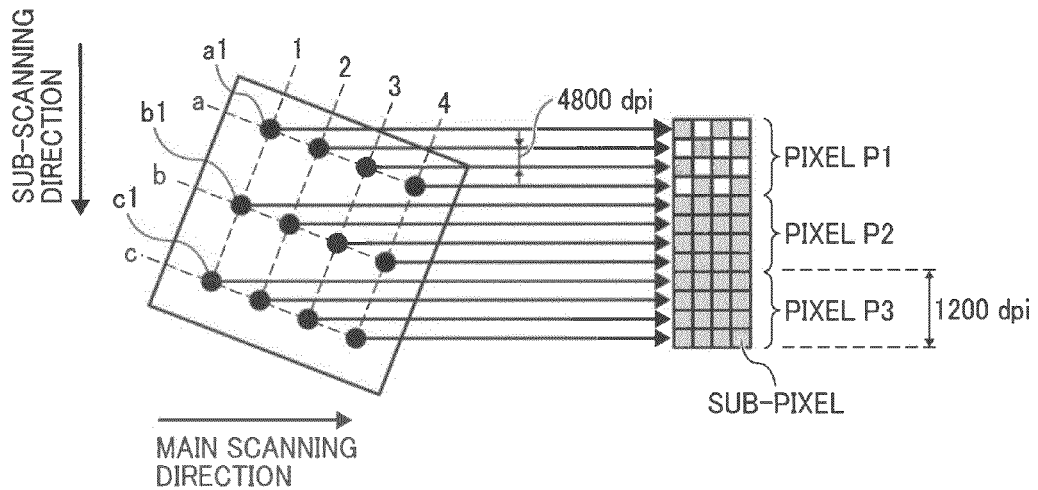
FIG. 24 is a first diagram showing an image forming apparatus that forms one pixel by plural light beams.
FIG. 25 is a second diagram showing the image forming apparatus that forms one pixel by plural light beams.
Figure 26A:
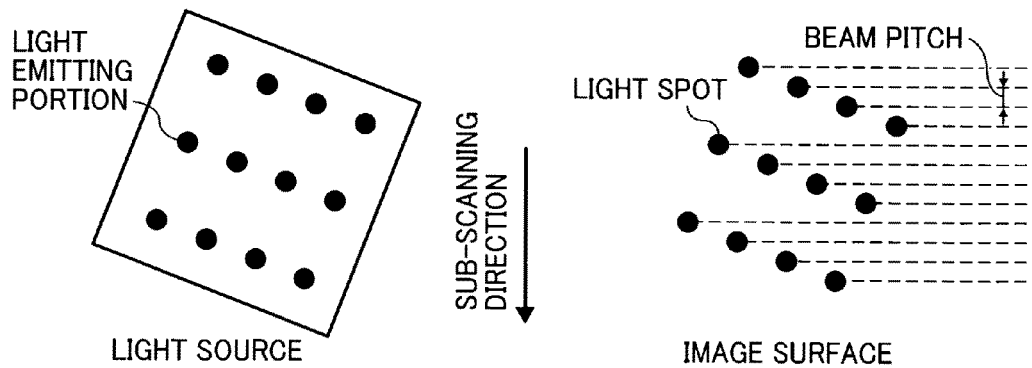
FIGS. 26A to 26C are diagrams showing the deviation of the beam pitch.
Figure 26B:
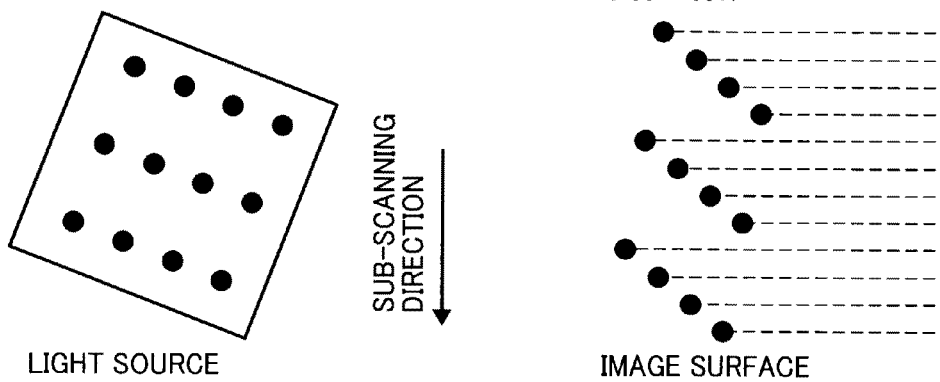
Figure 26C:
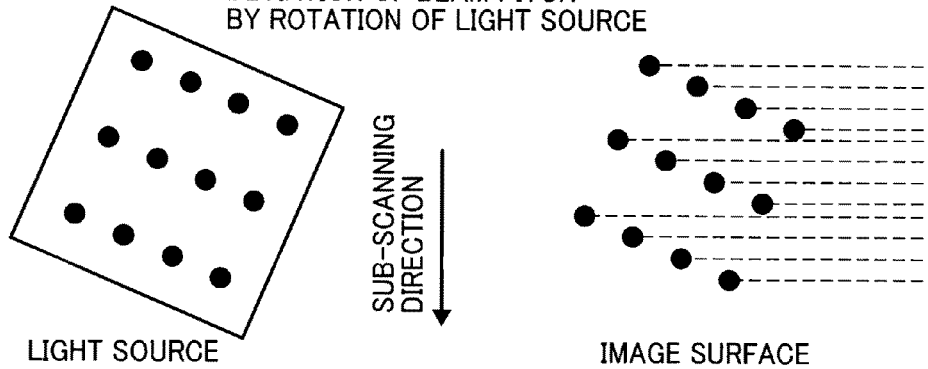
Figure 27:
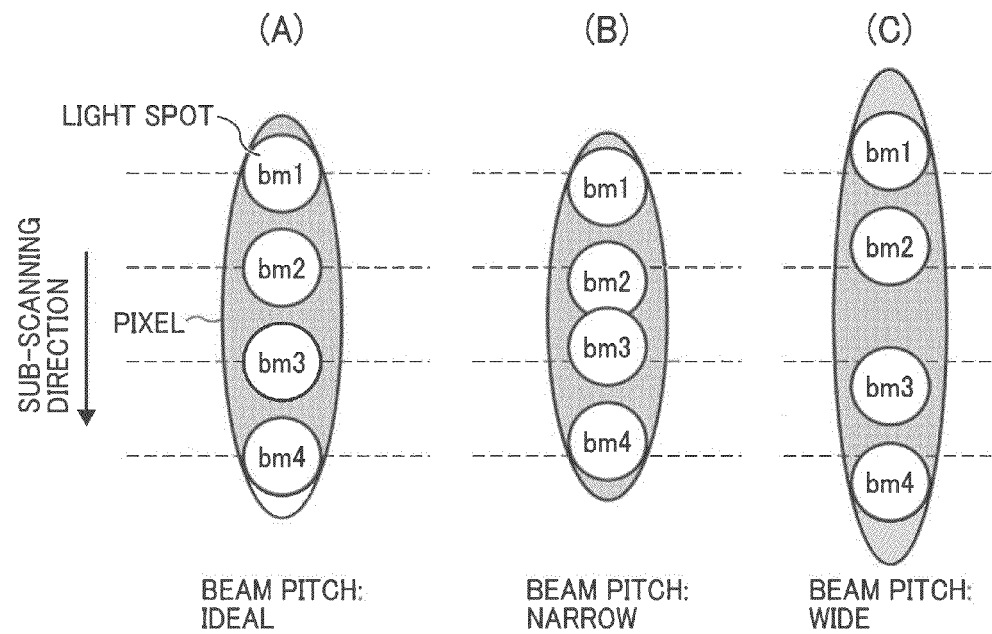
FIGS. 27(A) to 27(C) are diagrams showing an influence from the deviation of the beam pitch.
Figure 28:
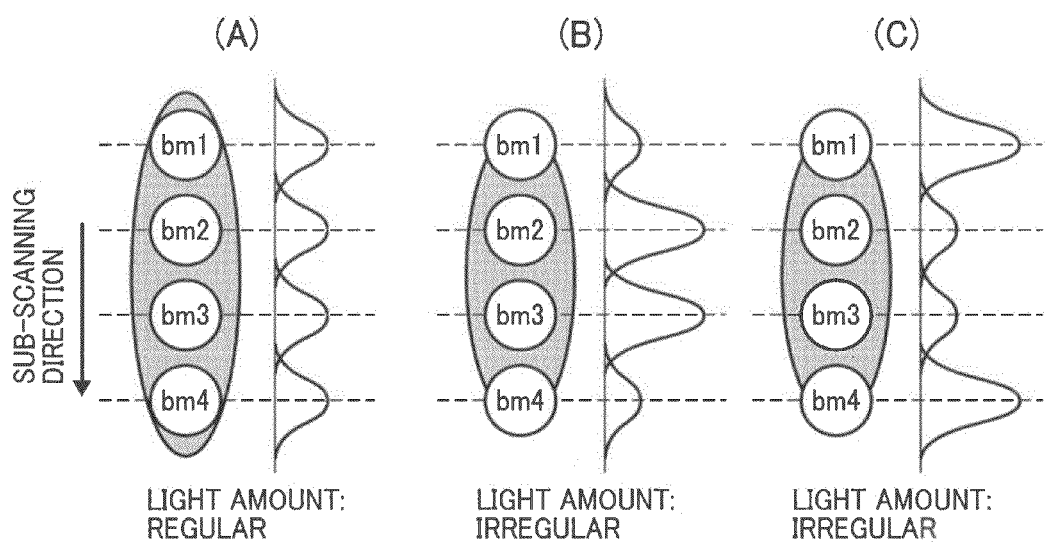
FIGS. 28(A) to 28(C) are diagrams showing an influence from the light amount difference in one pixel forming light emitting portion.
Figure 29:
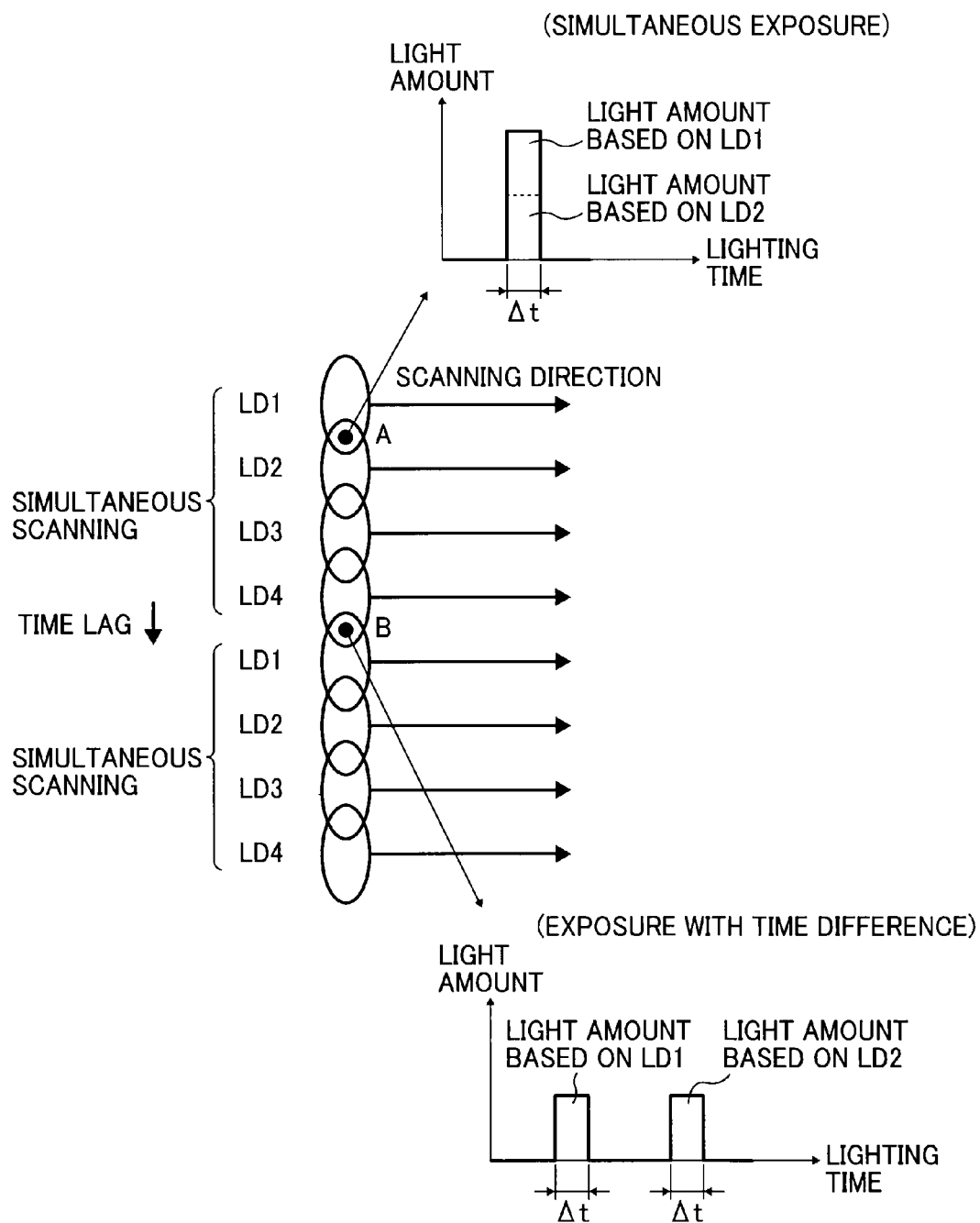
FIG. 29 is a first diagram showing a reciprocity failure.
Figure 30:
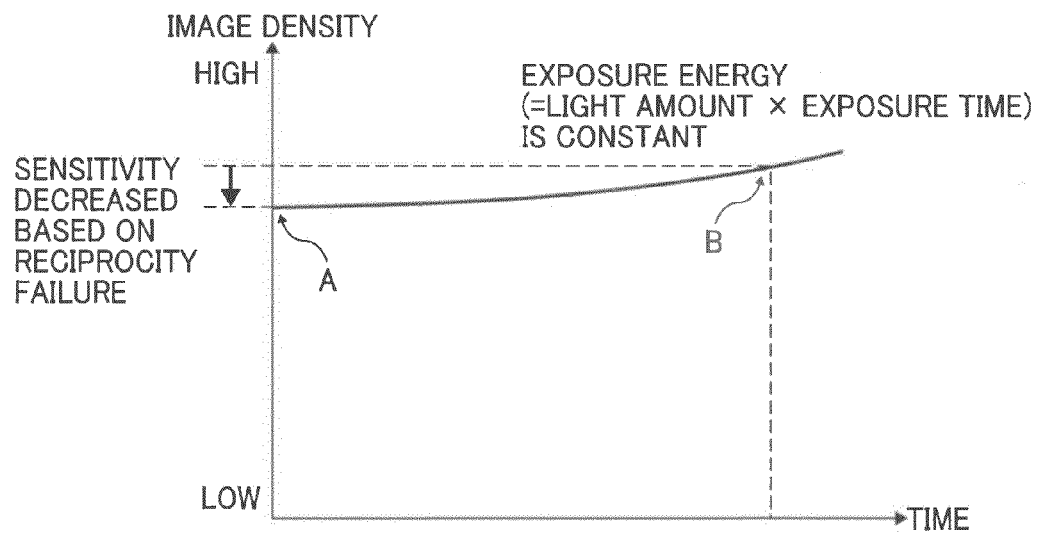
FIG. 30 is a second diagram showing the reciprocity failure.
Figure 31:
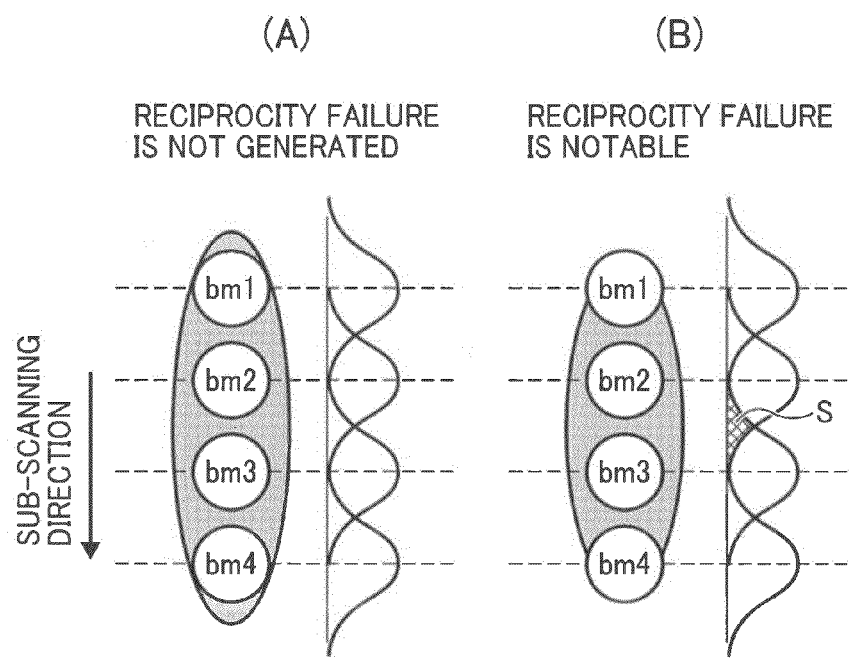
FIGS. 31(A) to 31(B) are diagrams showing an influence from the reciprocity failure.

As shown in FIG. 22, one pixel is formed by two light beams and a dither matrix represents 36 gray-scale levels of 6×6. In FIG. 22, the pixel density of one pixel is 1200 dpi and the density of horizontal parallel lines is 200 lpi. The write density per light beam is 2400 dpi.

When a latent image of L=1 corresponding to a first dot line is formed on the photosensitive drum by four light beams of a light beam from the light emitting portion ch16, a light beam from the light emitting portion ch8, a light beam from the light emitting portion ch9, and a light beam from the light emitting portion ch1, one dot line is formed by three-time scanning by lighting (turning on) the light emitting portion ch16 by the first scanning, lighting (turning on) the light emitting portions ch8 and ch9 by the second scanning, and lighting (turning on) the light emitting portion ch1 by the third scanning.

Similar to the case of L=1, one dot line that is formed by the light beam from the light emitting portion ch16, the light beam from the light emitting portion ch8, the light beam from the light emitting portion ch9, and the light beam from the light emitting portion ch1 is L=3 (third line). That is, a combination of the pixel forming light emitting portions becomes periodically the same for every two dot lines.

When a latent image of L=2 corresponding to a second dot line is formed by four light beams from the light emitting portions ch12, ch13, ch4, and ch5, one dot line is formed by two-time scanning by lighting (turning on) the light emitting portions ch12 and ch13 by the first scanning and lighting (turning-on) the light emitting portions ch4 and ch5 by the second scanning.

As such, the case where one dot line is formed by the two-time scanning and the case where one dot line is formed by the three-time scanning are mixed according to the combinations of the pixel forming light emitting portions.

Even in this case, similar to the case where the image is formed by the interlacing scanning, the deviation of the beam pitch (see FIGS. 23A and 23B), the light amount difference of the individual light beams, and the influence of the reciprocity failure can be corrected.

That is, even though an image is formed by any scanning method, the banding based on the deviation of the beam pitch, the banding based on the light amount difference of the individual light beams, and the banding based on the reciprocity failure can be decreased.

As can be seen from the above description, in the optical scanning device 2010 according to this embodiment, a control device of the optical scanning device in this invention is configured by the scanning control device.

As described above, the optical scanning device 2010 according to this embodiment is used in an image forming apparatus in which one pixel is formed by at least two light beams, and includes the four light sources 2200a, 2200b, 2200c, and 2200d, the polygon mirror 2104 that deflects the light beams from the individual light sources, the four scanning optical systems that individually condense the light beams deflected by the polygon mirror 2104 on the surfaces of the four photosensitive drums 2030a to 2030d, and the scanning control device.

Each light source has the plural light emitting portions that are disposed at the different positions in at least the sub-scanning corresponding direction.

In the memory 220 of the scanning control device, the correction data of the deviation of the beam pitch, the correction data of the light amount difference, and the correction data to decrease the influence of the reciprocity failure are stored in the table format for each combination of the pixel forming light emitting portions.

When the write signal is generated, the write control circuit 219 of the scanning control device reads the correction data of the deviation of the beam pitch, the correction data of the light amount difference, and the correction data of the reciprocity failure according to the combination of the image forming light emitting portions from the memory 220, overlaps the correction data to correction data of the APC, and outputs the overlapped data to the corresponding light source unit as the light amount correction data. That is, according to the combination of the pixel forming light emitting portions, the driving states of the light emitting portions that are included in the combination are controlled.

Therefore, the banding based on the deviation of the beam pitch, the banding based on the light amount difference, and the banding based on the reciprocity failure can be decreased.

In the related art, various attempts to decrease the deviation of the beam pitch are made. However, the decrease of the banding that considers the generation of the deviation of the beam pitch is not achieved.

Since the color printer 2000 according to this embodiment includes the optical scanning device 2010, a high-quality image can be formed at a high speed.

In the embodiment, the correction data that is suitable for the optical scanning device 2010 is stored in the memory 220 in the table format. However, the present invention is not limited thereto.

For example, a relationship between the deviation amount of the beam pitch and the correction data may be stored in the memory 220, for each combination of the pixel forming light emitting portions. In this case, the deviation amount of the beam pitch of the optical scanning device is input (registered) from an operation panel of the color printer, and the write control circuit 219 reads correction data according to the registered deviation amount of the beam pitch from the memory 220. A correction value with respect to the deviation amount that is not stored in the memory may be calculated by interpolation.

The relationship between the deviation amount of the beam pitch and the correction data may be stored in the memory 220 in a form of an operation expression.

The memory 220 may store actual driving data, instead of the correction data.

In the embodiment, the case where the light emission power is adjusted and the light amount is corrected is described, but the present invention is not limited thereto. For example, the pulse width of a light emission pulse may be adjusted and the light amount may be corrected.

In the embodiment, the case where the oscillation wavelength of each light emitting portion is at the band of 780 nm is described, but the present invention is not limited thereto. For example, the oscillation wavelength of each light emitting portion may be changed according to the characteristic of the photoreceptor.

In the embodiment, the case where the color printer 2000 is used as the image forming apparatus is described, but the present invention is not limited thereto. For example, an image forming apparatus that includes the optical scanning device 2010 may be used.

For example, an image forming apparatus where media (for example, paper) producing a color by a laser beam is directly illuminated by the laser beam may be used.

Further, an image forming apparatus that uses a silver salt film as an image carrier may be used. In this case, a latent image is formed on the silver salt film by optical scanning, and the latent image is visualized by the same process as a development process in a common silver salt photographic process. The latent image can be transferred to photographic printing paper by the same process as a printing process in the common silver salt photographic process. This image forming apparatus can be implemented as an optical plate making device or an optical drawing device that draws a CT scanning image.

In the embodiment, the case where the optical scanning device 2010 is used in the printer is described. However, the optical scanning device 2010 may be used in image forming apparatuses other than the printer, for example, a copy machine, a facsimile, and a multifunctional device.

In the embodiment, the case where the four photosensitive drums are used is described. However, the present invention is not limited thereto.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that is used in an image forming apparatus where one pixel is formed by at least two light beams, and scans a scanned surface of the image forming apparatus in a main scanning direction by the at least two light beams, the optical scanning device comprising:

a surface emitting laser array where a plurality of light emitting portions are arranged two-dimensionally at different positions in at least a sub-scanning direction, the plurality of light emitting portions formed on a same substrate;

a deflector that deflects light beams from the surface emitting laser array; and a control device that controls a driving state of at least one light emitting portion included in a combination of the light emitting portions to emit the at least two light beams to form the one pixel, among the plurality of light emitting portions, according to a positional relationship between at least two light emitting portions included in the combination in the sub-scanning direction, wherein at least two scan lines that are formed by the at least two light beams to form the one pixel are formed at different timings in two scan lines adjacent to each other, the control device corrects light amounts of the light emitting portions according to an interval in the sub-scanning direction of the two scan lines adjacent to each other such that light emission amounts of at least one light emitting portion included in the combination increase with respect to an initial setting value and light emission amounts of at least another light emitting portion included in the combination decrease with respect to the initial setting value, and the at least two light beams to form the one pixel are deflected on different deflected reflection surfaces of the deflector.

2. The optical scanning device of claim 1, wherein the combination includes a light emitting portion other than light emitting portions of both ends about the sub-scanning direction among the plurality of light emitting portions.

3. The optical scanning device of claim 1,
wherein the control device corrects a periodic density irregularity that is generated due to a deviation of beam pitch on the scanned surface.

4. The optical scanning device of claim 3,
wherein the control device further corrects a periodic density irregularity that is generated due to a light amount difference of the light emitting portions included in the combination.

5. The optical scanning device of claim 3,
wherein the control device further corrects a periodic density irregularity that is generated due to a reciprocity failure.

6. The optical scanning device of claim 1, wherein
a plurality of combinations exists as the combination of the light emitting portions to emit the at least two light beams to form the one pixel,
a table includes correction data of driving conditions of the light emitting portions included in each of the plurality of combinations that is set in advance, and
the control device refers to the table at a time of scanning, acquires the correction data that corresponds to the combination of the light emitting portions to emit the at least two light beams to form the one pixel in the scanning, and corrects the driving conditions using the correction data.

7. The optical scanning device of claim 1, wherein
a plurality of combinations exist as the combination of the light emitting portions to emit the at least two light beams to form the one pixel,
each of the plurality of combinations has a table where driving conditions of the light emitting portions included in the combination are set in advance, and
the control device refers to the table at the time of scanning, acquires the driving conditions that correspond to the combination of the light emitting portions to emit the at least two light beams to form the one pixel in the scanning, and controls driving states of the light emitting portions included in the combination using the driving conditions.

8. The optical scanning device of claim 1, wherein
a plurality of combinations exist as the combination of the light emitting portions to emit the at least two light beams to form the one pixel, and
the control device corrects the light amount of the light emitting portions based on correction data according to each of the plurality of combinations.

9. The optical scanning device of claim 1, wherein
the control device corrects the light amounts of the at least one light emitting portion and the at least another light emitting portion included in the combination before controlling a driving state of the at least one light emitting portion and the at least another light emitting portion included in the combination.

10. The optical scanning device of claim 1, wherein
the control device corrects the light amount of the light emitting portions such that a change amount of a total energy in the at least two light beams forming the one pixel by the control device can be maintained at ±20% or less.

11. An image forming apparatus, comprising:
at least one image carrier; and
at least one optical scanning device that scans at least one image carrier by light modulated according to image information, the at least one optical scanning device including:
a surface emitting laser array where a plurality of light emitting portions are arranged two-dimensionally at different positions in at least a sub-scanning direction, the plurality of light emitting portions formed on a same substrate; and
a deflector that deflects light beams from the surface emitting laser array; and
a control device that controls a driving state of at least one light emitting portion included in a combination of the light emitting portions to emit at least two light beams to form one pixel, among the plurality of light emitting portions, according to a positional relationship between the at least two light emitting portions included in the combination in the sub-scanning direction, wherein
at least two scan lines that are formed by the at least two light beams to form the one pixel are formed at different timings in two scan lines adjacent to each other,
the control device corrects light amounts of the light emitting portions according to an interval in the sub-scanning direction of the two scan lines adjacent to each other such that light emission amounts of at least one light emitting portion included in the combination increase with respect to an initial setting value and light emission amounts of at least another light emitting portion included in the combination decrease with respect to the initial setting value, and
the at least two light beams to form the one pixel are deflected on different deflected reflection surfaces of the deflector.

12. The image forming apparatus of claim 11,
wherein the image information is image information of multiple colors.

13. The image forming apparatus according to claim 11, wherein
a plurality of combinations exist as the combination of the light emitting portions to emit the at least two light beams to form the one pixel, and
the control device corrects the light amount of the light emitting portions based on correction data according to each of the plurality of combinations.

14. The image forming apparatus according to claim 11, wherein
the control device corrects the light amounts of the at least one light emitting portion and the at least another light emitting portion included in the combination before controlling a driving state of the at least one light emitting portion and the at least another light emitting portion included in the combination.

15. The image forming apparatus according to claim 11, wherein
the control device corrects the light amount of the light emitting portions such that a change amount of a total energy in the at least two light beams forming the one pixel by the control device can be maintained at ±20% or less.

* * * * *